(12) United States Patent
Song et al.

(10) Patent No.: US 6,905,917 B2
(45) Date of Patent: Jun. 14, 2005

(54) THIN FILM TRANSISTOR ARRAY PANEL FOR LIQUID CRYSTAL DISPLAY AND METHOD FOR MANUFACTURING THE SAME

(75) Inventors: Jean-Ho Song, Pyengtaek (KR); Chang-Oh Jeong, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 199 days.

(21) Appl. No.: 10/112,890

(22) Filed: Apr. 1, 2002

(65) Prior Publication Data

US 2003/0036221 A1 Feb. 20, 2003

(30) Foreign Application Priority Data

Aug. 20, 2001 (KR) ........................................ 2001-49963

(51) Int. Cl.[7] .............................................. H01L 29/74
(52) U.S. Cl. ...................... 438/149; 438/151; 438/153; 438/157; 438/161; 438/197; 438/257
(58) Field of Search ................................ 438/149, 151, 438/153, 157, 161, 197, 257

(56) References Cited

U.S. PATENT DOCUMENTS 6,300,152 B1 * 10/2001 Kim ............................ 438/30
6,387,737 B1 * 5/2002 Yamazaki et al. ........... 438/148
6,586,286 B2 * 7/2003 Park et al. ................... 438/155

* cited by examiner

Primary Examiner—Long Pham
Assistant Examiner—Wai-Sing Louie
(74) Attorney, Agent, or Firm—F.Chau & Associates, LLC

(57) ABSTRACT

A method of fabricating a thin film transistor array panel for a liquid crystal display is provided. A gate line assembly is formed on an insulating substrate. The gate line assembly includes gate lines and gate electrodes connected to the gate lines. A gate insulating layer is formed on the insulating substrate having the gate line assembly. A semiconductor layer is formed on the gate insulating layer. A data line assembly is formed, the data line assembly includes data lines crossing over the gate lines, source electrodes connected to the data lines and placed adjacent to the gate electrodes, and drain electrodes placed opposite to the source electrodes with respect to the gate electrodes. A protective layer is deposited onto the insulating substrate having the data line assembly. The protective layer is patterned to form first contact holes exposing the drain electrodes. Pixel electrodes are formed on the protective layer such that the pixel electrodes are electrically connected to the drain electrodes, wherein one of the gate line assembly and the data line assembly further includes a low resistance conductive layer.

11 Claims, 31 Drawing Sheets

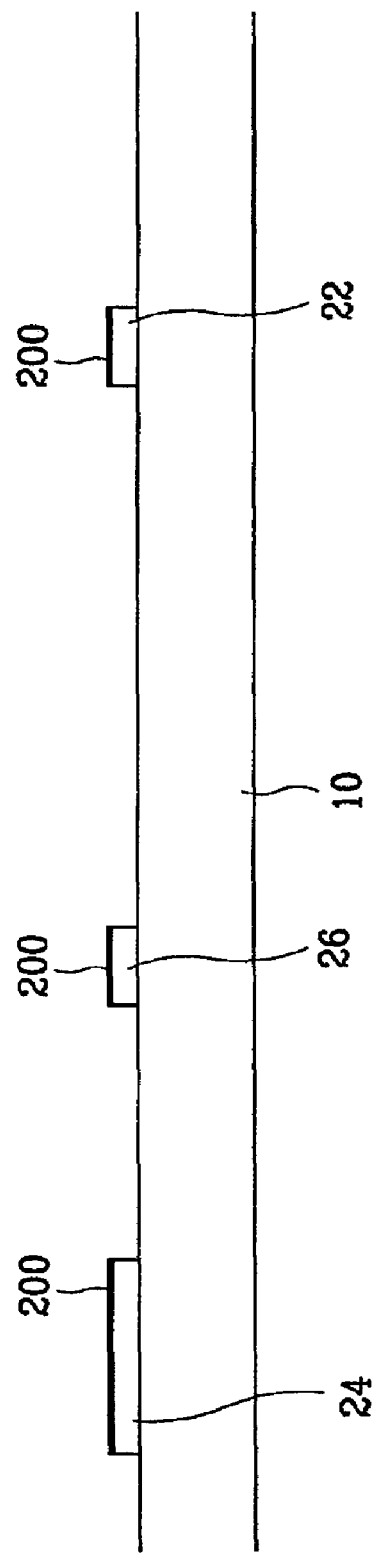

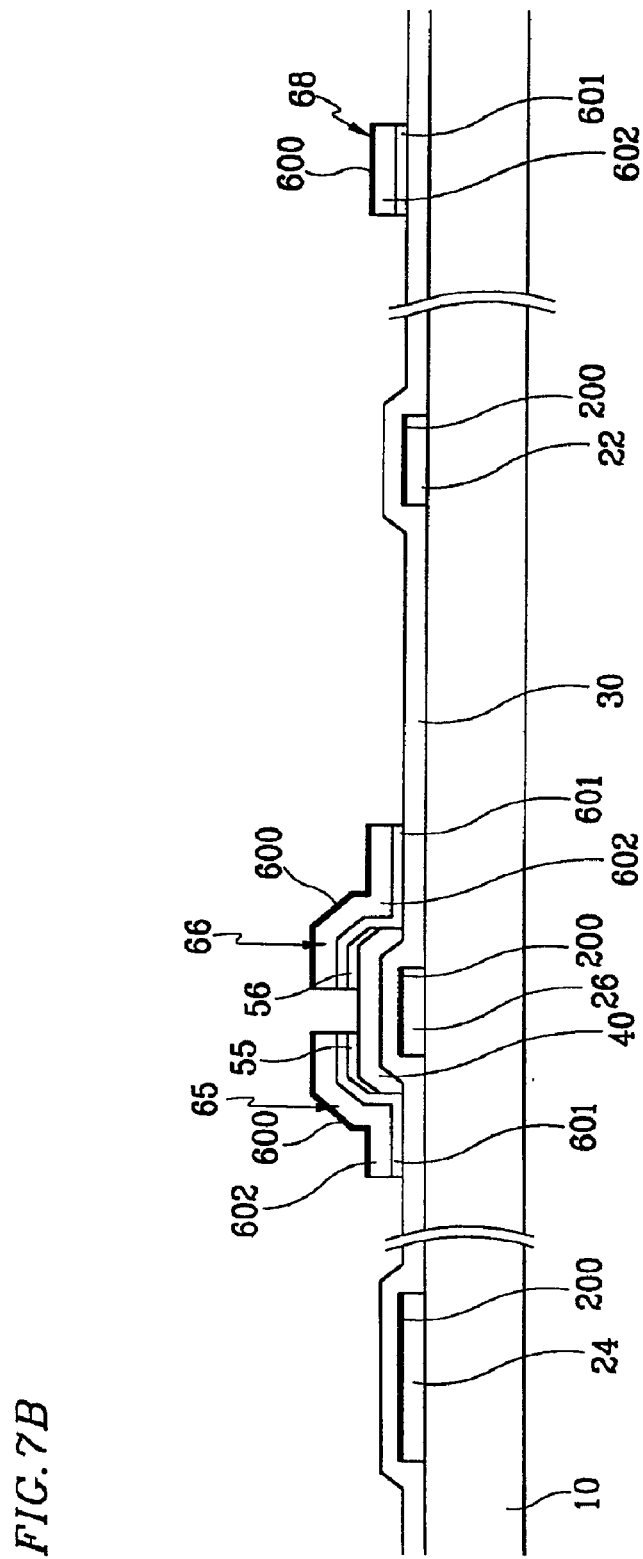

THIN FILM TRANSISTOR ARRAY PANEL FOR LIQUID CRYSTAL DISPLAY AND METHOD FOR MANUFACTURING THE SAME

BACKGROUND OF THE INVENTION (a) Field of the Invention

The present invention relates to a thin film transistor array panel for a liquid crystal display, and a method for manufacturing the same.

(b) Description of the Related Art

Generally, a liquid crystal display has two panels having electrodes, and a liquid crystal layer sandwiched between the two panels. Voltages are applied to the electrodes so that the liquid crystal molecules in the liquid crystal layer are re-oriented to thereby control light transmission.

Thin film transistors are formed on one of the panels for switching the voltages applied to the electrodes, and the panel having the thin film transistors is usually called "thin film transistor array panel". The thin film transistor array panel is generally fabricated through photolithography using masks. One way to reduce production costs is by reducing the number of masks.

Meanwhile, a low resistance material such as aluminum (Al) or aluminum alloy is used for forming wiring lines for the thin film transistor array panel to transmit applied signals with minimal delay. Furthermore, indium tin oxide (ITO) is generally used for forming pixel electrodes for the thin film transistor array panel. However, the ITO has poor contact characteristic with aluminum or aluminum alloy. Therefore, molybdenum or chrome instead of aluminum or aluminum alloy can be interposed between the wiring layer and the ITO-based pixel electrode. However, the manufacturing process is more complicated because the aluminum or aluminum alloy in pad regions must be removed.

Recently, indium zinc oxide (IZO) is proposed for forming the pixel electrodes as well as in forming the pads. However, IZO increases overall contact resistance at contact areas between the respective wiring line components including pads, which deteriorate image display characteristics of the liquid crystal display device. Thus, it is desirable to provide a method of fabricating a thin film transistor array panel for a liquid crystal display which has low resistance material-based wiring lines while ensuring reliability at the contact area.

SUMMARY OF THE INVENTION

A method of fabricating a thin film transistor array panel for a liquid crystal display is provided, which includes the steps of: forming a gate line assembly on an insulating substrate, the gate line assembly including gate lines and gate electrodes connected to the gate lines; forming a gate insulating layer on the insulating substrate having the gate line assembly; forming a semiconductor layer on the gate insulating layer; forming a data line assembly, the data line assembly including data lines crossing over the gate lines, source electrodes connected to the data lines and placed adjacent to the gate electrodes, and drain electrodes placed opposite to the source electrodes with respect to the gate electrodes; depositing a protective layer onto the insulating substrate having the data line assembly; patterning the protective layer to form first contact holes exposing the drain electrodes; and forming pixel electrodes on the protective layer such that the pixel electrodes are electrically connected to the drain electrodes, wherein one of the gate line assembly and the data line assembly further includes a low resistance conductive layer.

According to an embodiment of the present invention, the gate line assembly and the data line assembly further includes a first low resistance conductive layer and a second low resistance conductive layer, respectively. The first low resistance conductive layer and the second low resistance conductive layer are continuously formed on the gate line assembly and the data line assembly, respectively, in a vacuum condition.

According to an embodiment of the present invention, the low resistance conductive layer is formed through reactive sputtering with addition of nitrogen gas. The low resistance conductive layer includes a layer containing nitrogen. The nitride containing layer includes one of an aluminum nitride layer, aluminum alloy nitride layer, and aluminum/neodymium alloy nitride layer.

According to an embodiment of the present invention, the gate line assembly includes one of a first conductive layer having aluminum, aluminum alloy, and aluminum/neodymium alloy. The gate line assembly further includes a second conductive layer having molybdenum or molybdenum alloy. The data line assembly includes a first conductive layer having aluminum or aluminum alloy. The data line assembly further includes a second conductive layer having one of molybdenum, molybdenum alloy molybdenum/tungsten alloy, chrome, and tantalum. The gate line assembly further includes gate pads for receiving scanning signals from the outside and transmitting the scanning signals to the gate lines, the data line assembly further includes data pads for receiving image signals from the outside and transmitting the image signals to the data lines, and the protective layer further includes second contact holes exposing the data pads and third contact holes exposing the gate pads together with the gate insulating layer, and the method further comprising the step of forming subsidiary gate pads and subsidiary data pads at the same level as the pixel electrodes such that the subsidiary gate pads and subsidiary data pads are electrically connected to the gate pads and the data pads through the second contact holes and the third contact holes, respectively.

According to an embodiment of the present invention, the pixel electrodes are formed with indium zinc oxide. The data line assembly and the semiconductor layer are formed through one photolithography process using a photoresist pattern differentiated in thickness. The data line assembly and the semiconductor layer are formed using one mask.

A thin film transistor array panel for a liquid crystal display is also provided, which includes: a substrate; a gate line assembly formed on the substrate, the gate line assembly including gate lines proceeding in a horizontal direction to receive scanning signals, and gate electrodes connected to the gate lines; a gate insulating layer covering the gate line assembly; a semiconductor pattern formed on the gate insulating layer with a semiconductor material; a data line assembly formed on the semiconductor pattern or the gate insulating layer, the data line assembly including data lines proceeding in a vertical direction, source electrodes branched from the data lines, and drain electrodes facing the source electrodes around the gate electrodes while being separated from the source electrodes; a protective pattern formed on the data line assembly and the semiconductor pattern, the protective pattern including first contact holes exposing the drain electrodes; pixel electrodes formed on the protective pattern, the pixel electrodes being electrically connected to the drain electrodes through the first contact holes via the low resistance conductive layer, wherein one of the gate line assembly and the data line assembly further includes a low resistance conductive layer.

According to an embodiment of the present invention, the gate line assembly further includes gate pads connected to the gate lines to receive gate signals from the outside, the data line assembly further includes data pads connected to the data lines to receive image signals from the outside, and the protective pattern further includes second and third contact holes exposing the gate pads and the data pads, respectively, According to an embodiment of the present invention, the thin film transistor array panel further includes subsidiary gate and data pads formed at the same level as the pixel electrodes while being electrically connected to the gate and the data pads, respectively, through the second and the third contact holes, respectively, via the low resistance conductive layer. The pixel electrodes are formed with a transparent conductive material having indium zinc oxide. The gate line assembly and the data line assembly further include a first low resistance conductive layer and a second low resistance conductive layer, respectively. The low resistance conductive layer includes a layer containing nitrogen. The nitride containing layer includes an aluminum nitride layer or an aluminum alloy nitride layer. The gate line assembly includes a first conductive layer having one of aluminum, aluminum alloy, and aluminum/neodymium alloy. The gate line assembly further includes a second conductive layer having molybdenum or molybdenum alloy. The data line assembly includes a first conductive layer having aluminum or aluminum alloy. The data line assembly further includes a second conductive layer having one of molybdenum, molybdenum alloy, molybdenum alloy molybdenum/tungsten alloy, chrome, and tantalum. The semiconductor pattern has the same shape as the data line assembly except for the channel area between the source and the drain electrodes.

BRIEF DESCRIPTION OF THE DRAWINGS

A more complete appreciation of the invention and many of the attendant advantages thereof will be readily apparent as the same becomes better understood by reference to the following detailed description when considered in conjunction with the accompanying drawings in which like reference symbols indicate the same or the similar components, wherein:

FIG. 4B is a cross sectional view of the thin film transistor array panel taken along the IVb–IVb' line of FIG. 4A;

FIG. 7B is a cross sectional view of the thin film transistor array panel taken along the VIIb–VIIb' line of FIG. 7A;

DETAILED DESCRIPTION OF PREFERRED EMBODIMENTS

Preferred embodiments of this invention will be explained with reference to the accompanying drawings.

Figure 1:
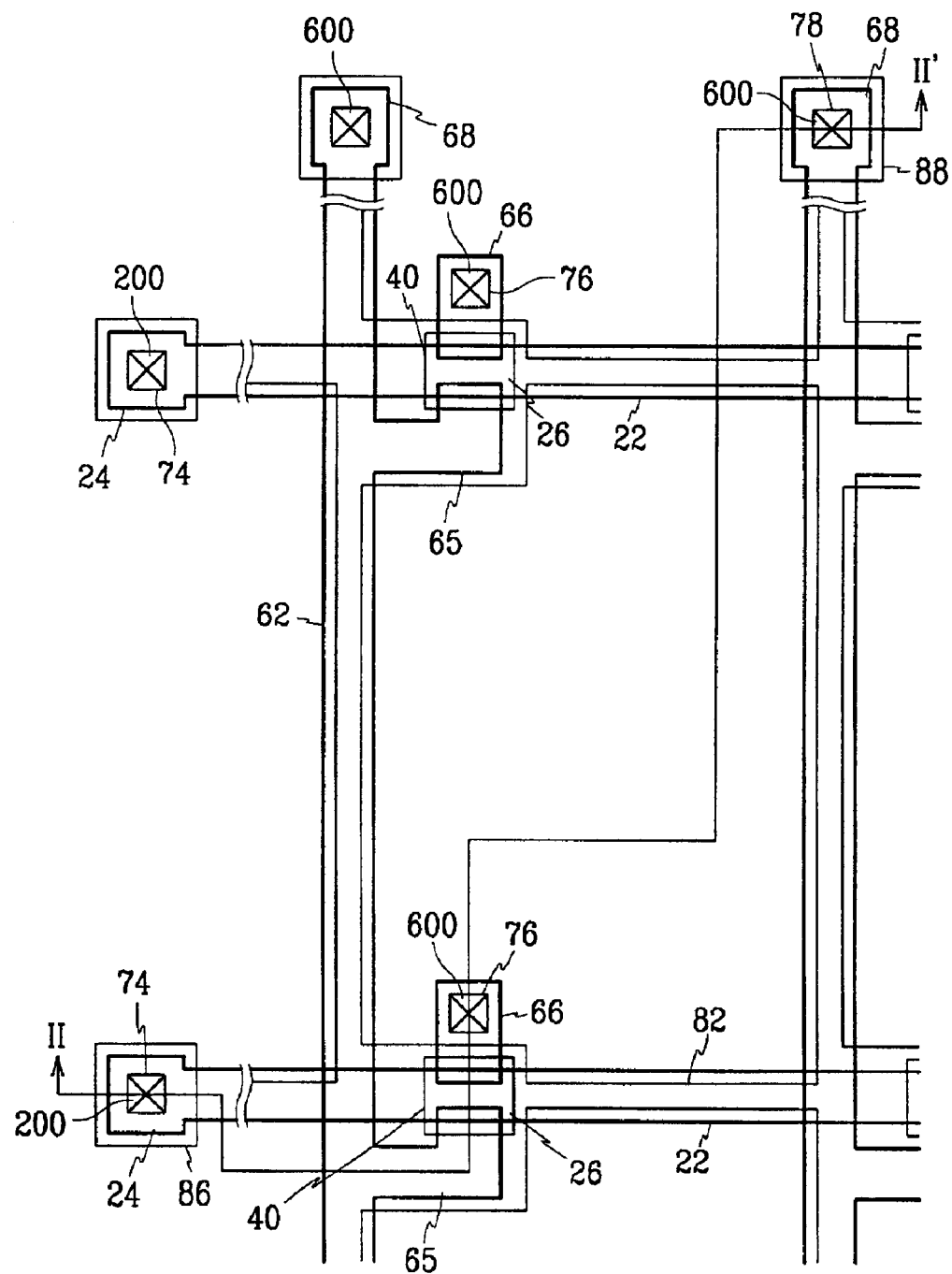
FIG. 1 is a plan view of a thin film transistor array panel for a liquid crystal display according to a preferred embodiment of the present invention.
Figure 2:
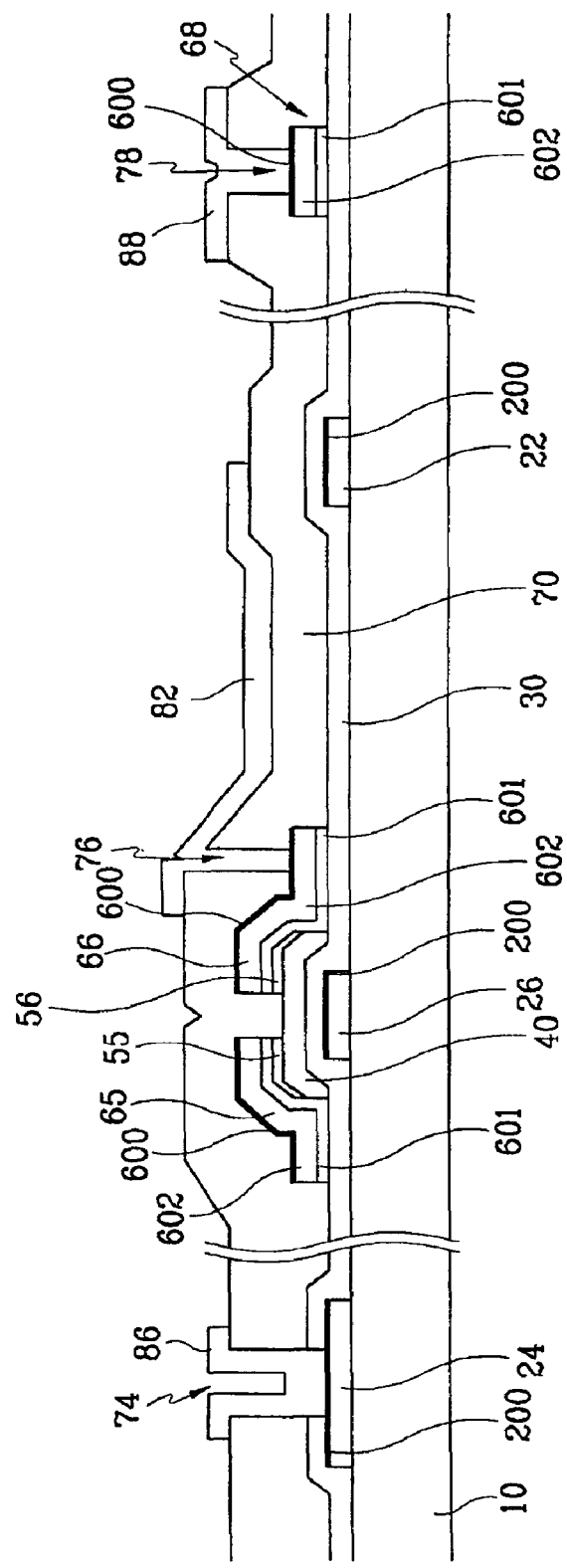
FIG. 2 is a cross sectional view of the thin film transistor array panel taken along the II–II' line of FIG. 1.
Figure 3:
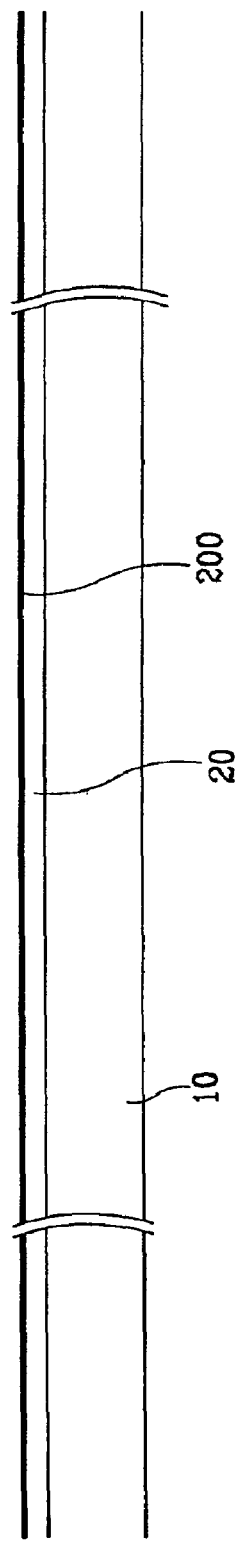
FIG. 3 illustrates the first step of fabricating the thin film transistor array panel shown in FIG. 1.

FIG. 1 is a plan view of a thin film transistor array panel for a liquid crystal display according to a preferred embodiment of the present invention. FIG. 2 is a cross sectional view of the thin film transistor array panel taken along the II–II' line of FIG. 1.

Referring to FIGS. 1 and 2, a gate line assembly is formed on an insulating substrate 10. According to an embodiment of the present invention, the gate assembly includes a first conductive layer having aluminum, aluminum alloy, or aluminum/neodymium alloy. The gate line assembly further includes a second conductive layer having molybdenum or molybdenum alloy. The gate line assembly includes gate lines 22 proceeding in the horizontal direction, gate pads 24 connected to the gate lines 22 to receive gate signals from the outside and transmit gate signals to the gate lines 22, and gate electrodes 26 connected to the gate lines 22.

A first low resistance conductive layer 200 is formed on the gate line assembly. According to an embodiment of the present invention, the first low resistance conductive layer 200 preferably includes an aluminum nitride layer, an aluminum alloy nitride layer, or aluminum/neodymium alloy nitride layer with conductive material for gate line assembly to minimize the contact resistance between the gate pads 24 and IZO-based subsidiary gate pads 84 to be formed later.

Next, a gate insulating layer 30 is formed on the substrate 10 with silicon nitride (SiNx) while covering the gate line assembly and the first low resistance conductive layer 200. The gate insulating layer 30 has contact holes 74 exposing the first low resistance conductive layer 200 over the gate pads 24 together with a protective layer 70 to be formed later.

A semiconductor layer 40 is formed on the gate insulating layer 30 over the gate electrodes 26, and ohmic contact layers 55 and 56 are formed on the semiconductor layer 40 with $n^+$-hydrogenated amorphous silicon where n-type impurities are doped at a high concentration.

A data line assembly is formed on the ohmic contact layers 55 and 56 and the gate insulating layer 30 with a metallic or conductive material. According to an embodiment of the present invention, the conductive material includes a first conductive layer having aluminum or aluminum alloy. The conductive material further includes a second conductive layer having molybdenum, molybdenum alloy, molybdenum/tungsten alloy (MoW), chrome (Cr), and tantalum (Ta). The data line assembly includes data lines 62 proceeding in the vertical direction while crossing over the gate lines 22 to define pixels, source electrodes 65 branched from the data lines 62 while being extended over the ohmic contact layer 55, data pads 68 connected to the data lines 62 to receive image signals from the outside, and drain electrodes 66 separated from the source electrodes 65 while being placed over the ohmic contact layer 56 opposite to the source electrodes 65 with respect to the gate electrodes 26. According to an embodiment of the present invention, the data line assembly can be formed with a single-layered structure, or a double or more-layered structure. When the data line assembly is formed with a double-layered structure, it is preferable that one layer is formed with a low resistance material such as aluminum and aluminum alloy, and the other layer is formed with a material having good contact characteristic with other materials such as molybdenum, molybdenum alloy, chrome, and tantalum. For example, Cr/Al or Al alloy, or Al/Mo can preferably be used for the data line assembly. In this preferred embodiment, the data line assembly is formed with a lower layer 601 based on Cr or MoW, and an upper layer 602 based on Al alloy.

A second low resistance conductive layer 600 is formed on the data line assembly to minimize the contact resistance between the data line assembly and pixel electrodes 82 formed with IZO or subsidiary data pads 88 to be formed later. The second low resistance conductive layer 600 enhances the contact characteristic between two different material-based conductive layers. According to an embodiment of the present invention, the second low resistance conductive layer 600 includes at least a conductive material such as aluminum and aluminum alloy for the upper layer 602 of the data line assembly, and nitrogen. The second low resistance conductive layer 600 also includes chrome, molybdenum, or molybdenum alloy as the conductive material.

A protective layer 70 is formed on the data line assembly and the semiconductor layer 40. The protective layer 70 has contact holes 76 and 78 exposing the second low resistance conductive layer 600 over the drain electrodes 66 and the data pads 68, respectively, and contact holes 74 exposing the first low resistance conductive layer 200 over the gate pads 24 together with the gate insulating layer 30.

A pixel line assembly is formed on the protective layer 70. The pixel line assembly includes pixel electrodes 82 electrically connected to the drain electrodes 66 at the respective pixels while being in contact with the second low resistance conductive layer 600 over the drain electrodes 66 through the contact holes 76, and subsidiary gate and data pads 86 and 88 connected to the first and second low resistance conductive layers 200 and 600, respectively, over the gate pads 24 and the data pads 68 through the contact holes 74 and 78, respectively.

Referring to FIGS. 1 and 2, the pixel electrodes 82 are overlapped with the gate lines 22 to thereby form storage capacitors. In case the desired storage capacitance is not obtained with the overlapping, a storage capacitor line assembly can be additionally provided at the same level as the gate line assembly.

As the above structure involves gate and data line assemblies including a low resistance conductive material such as aluminum or aluminum alloy, it can be well adapted for use in a wide-screened high definition liquid crystal display. Furthermore, as the data pads 68, the drain electrodes 66, and the gate pads 24 contact the subsidiary data pads 88, pixel electrodes 82, and subsidiary gate pads 84 by interposing the first and second low resistance conductive layers 200 and 600, the contact resistance at the contact area can be minimized while giving reliability to the pad portions. In this way, the display characteristics of the resulting display device can be enhanced.

A method of fabricating the thin film transistor array panel is explained with reference to FIGS. 3 to 8B as well as FIGS. 1 and 2.

A conductive layer 20 is deposited onto an insulating substrate 10 through sputtering. According to an embodiment of the present invention, the conductive layer 20 is preferably formed of aluminum/neodymium alloy. The sputtering is preformed in a sputtering chamber mounted with a low resistance aluminum/neodymium (Al/Nd) alloy target while supplying argon gas therein. Thereafter, a first low resistance conductive layer 200 is formed on the conductive layer 20 through reactive sputtering with the addition of nitrogen gas. According to an embodiment of the present invention, the first low resistance conductive layer 200 preferably includes an aluminum nitride layer, an aluminum alloy nitride layer, or aluminum/neodymium alloy nitride layer. A ratio of the argon gas to the nitrogen gas supplied into the sputtering chamber is controlled to have conductivity of the first low resistance conductive layer 200, and a thickness of the first low resistance conductive layer 200 is controlled to be patterned through wet or dry etching together with the underlying conductive layer 20. According to an embodiment of the present invention, the first low resistance conductive layer 200 is continuously deposited onto the conductive layer 20 without vacuum break, thereby preventing the forming of a high resistance layer, such as an $Al_2O_3$ layer, on the conductive layer 20 (in air). If such a high resistance layer is formed, contact resistance is increased.

Figure 4A:
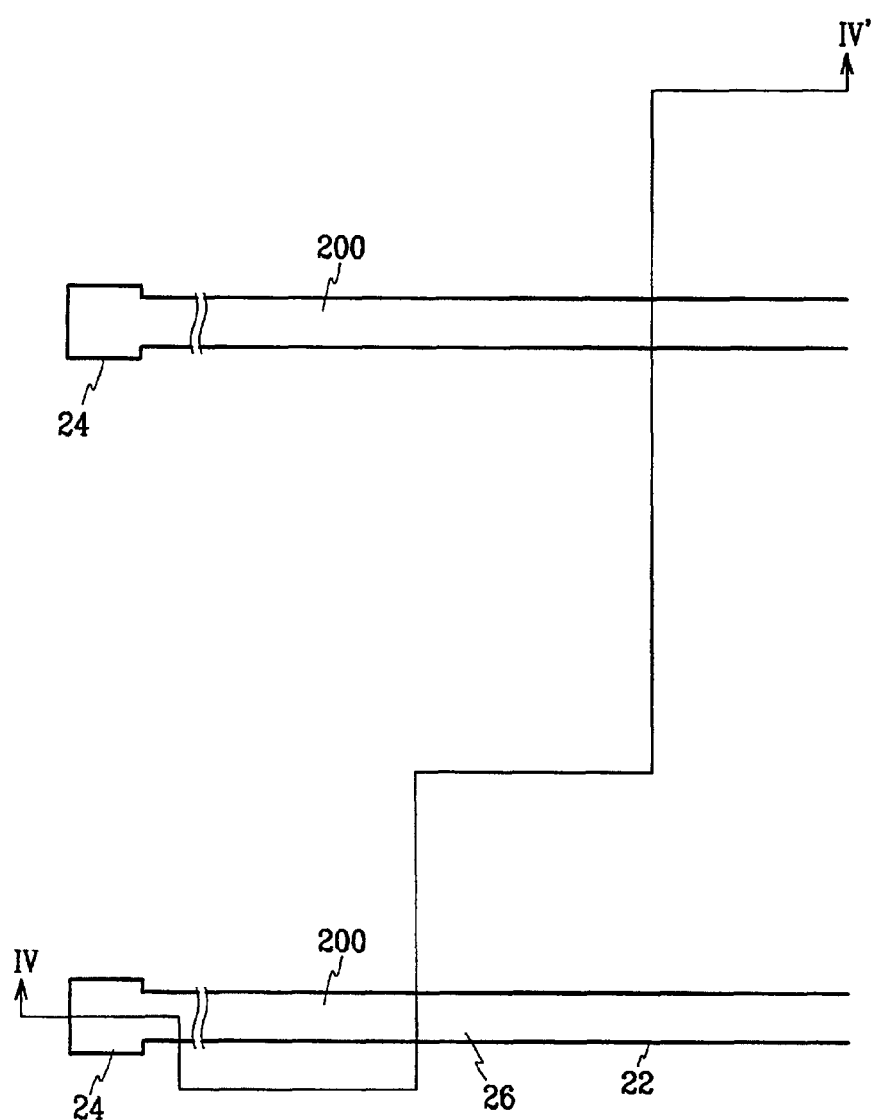
FIGS. 4A, 5A, 7A, and 8A illustrate the steps of fabricating the thin film transistor array panel following the step illustrated in FIG. 3.

Thereafter, referring to FIGS. 4A and 4B, the conductive layer 20 and the first low resistance conductive layer 200 are simultaneously patterned to thereby form a gate line assembly overlaid with the first low resistance conductive layer 200. The gate line assembly includes gate lines 22, gate electrodes 26, and gate pads 24.

Figure 5A:
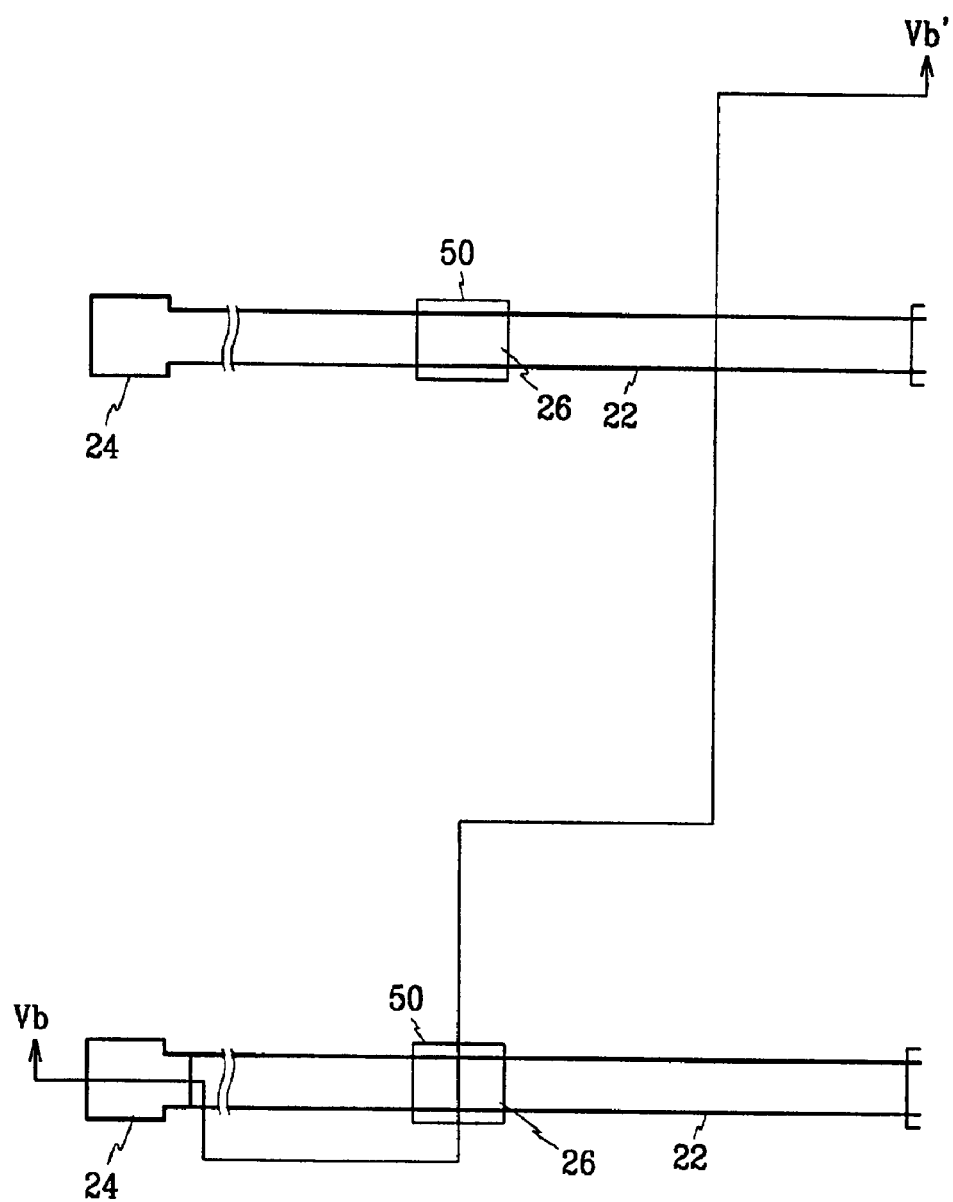
Figure 5B:
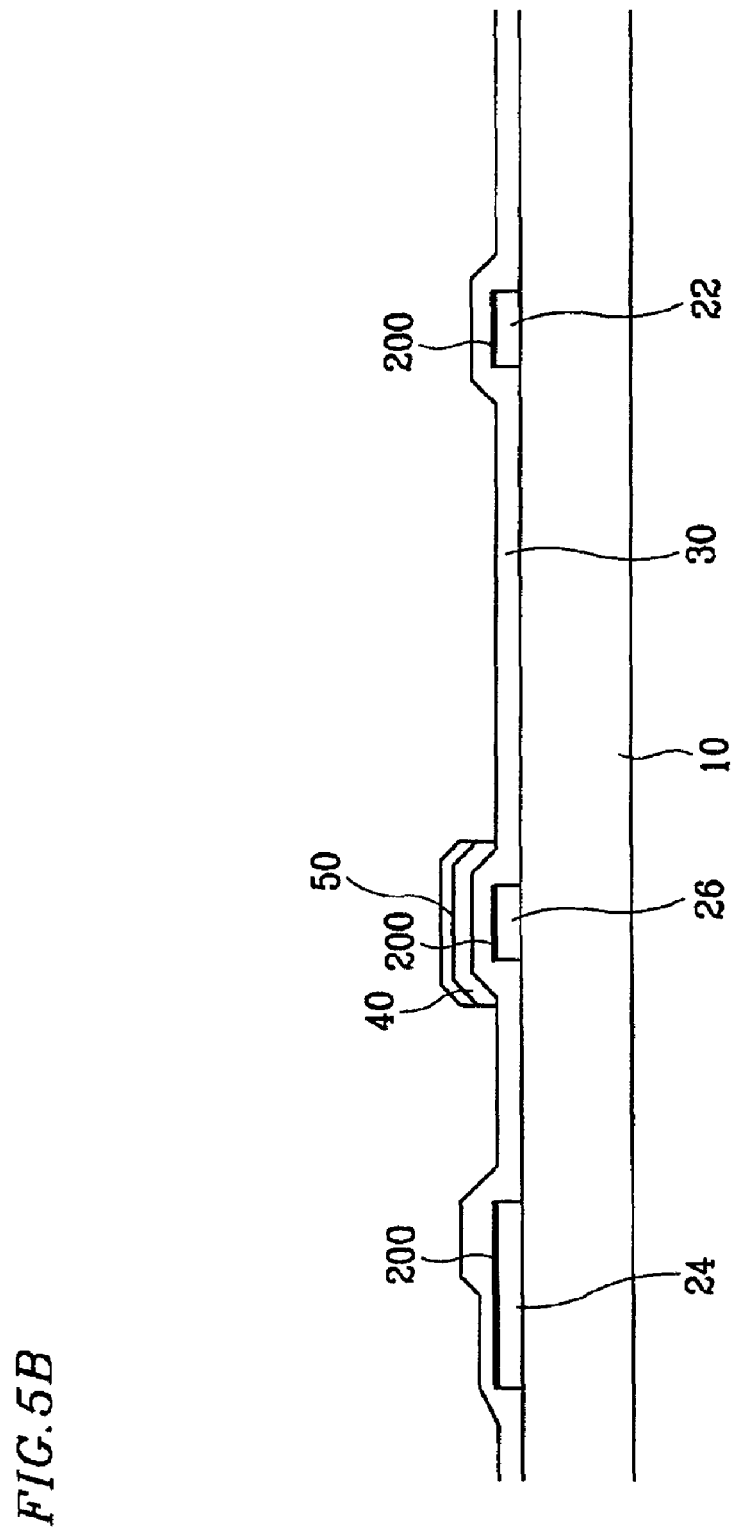
FIG. 5B is a cross sectional view of the thin film transistor array panel taken along the Vb–Vb' line of FIG. 5A.

Referring to FIGS. 5A and 5B, a gate insulating layer 30, a semiconductor layer 40 formed with an amorphous silicon and a doped amorphous silicon-based layer 50 are sequentially deposited onto the insulating substrate 10. The semiconductor layer 40 and the doped amorphous silicon layer 50 are patterned using a mask to thereby form a semiconductor layer 40 and an ohmic contact layer 50 on the gate insulating layer 30 over the gate electrodes 26.

Figure 6:
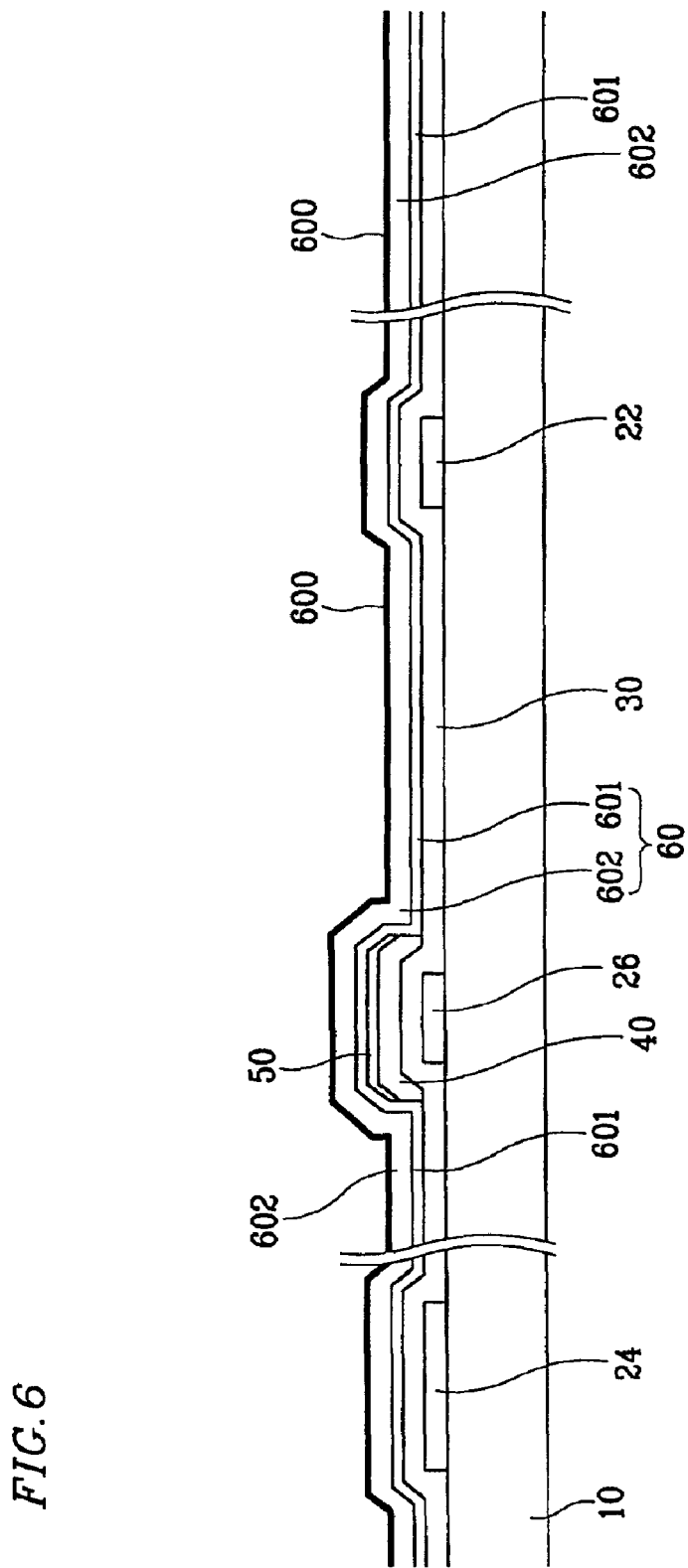
FIG. 6 illustrates the step of fabricating the thin film transistor array panel following the step illustrated in FIG. 5B.

Referring to FIG. 6, a lower layer 601 is deposited onto the substrate 10 with molybdenum, molybdenum/tungsten alloy or chrome in a thickness of about 300 Å, and an upper layer 602 is deposited onto the lower layer 601 with aluminum/neodymium alloy in a thickness of about 2500 Å. A second low resistance conductive layer 600 is continuously deposited onto the upper layer 602 through reactive sputtering within the same sputtering chamber for forming the lower layer 601 and the upper layer 602 under the vacuum atmosphere while supplying nitrogen gas therein. According to an embodiment of the present invention, the second low resistance conductive layer 600 is preferably formed with aluminum/neodymium alloy nitride. In this way, the forming of a high resistance layer such as an $Al_2O_3$ layer on the upper layer 602, such as Al/Nd layer 602 in air is prevented. If the high resistance layer is formed, contact resistance at the contact area is increased for subsequent processing steps.

Figure 7A:
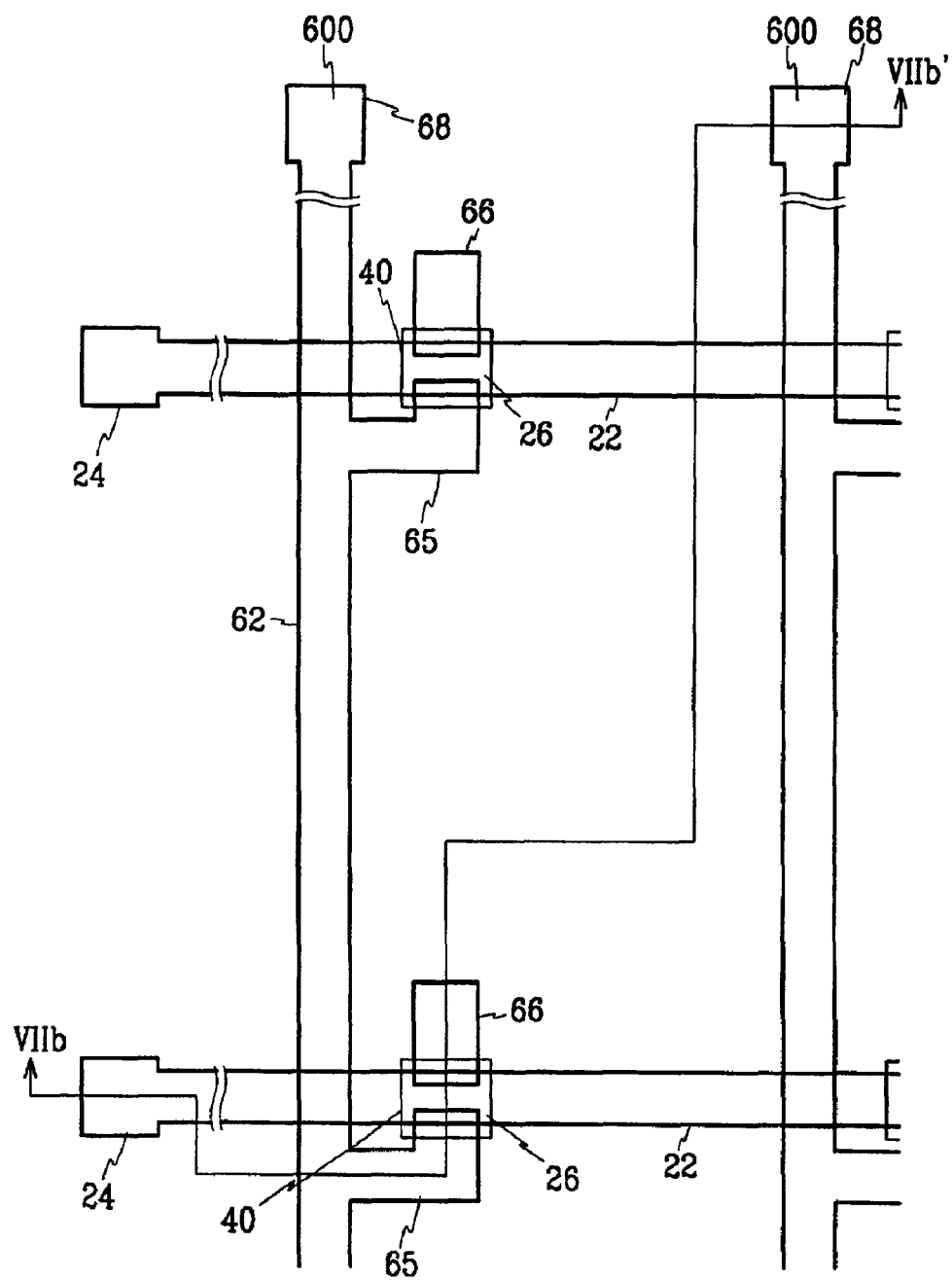

Referring to FIGS. 7A and 7B, the second low resistance conductive layer 600, the upper layer 602, and the lower layer 601 are patterned through photolithography using a mask (not shown) to thereby form a data line assembly overlaid with a second low resistance conductive layer 600. According to an embodiment of the present invention, the upper layer 602 and the lower layer 601 can be etched through wet etching. Alternatively, the upper layer 602 is etched through wet etching, whereas the lower layer 601 is etched through dry etching. In case the lower layer 601 is formed with molybdenum or molybdenum/tungsten alloy, the lower layer 601 and the upper layer 602 are preferably patterned through wet etching together.

Thereafter, the doped amorphous silicon layer 50 (in FIG. 6) exposed by etching the second low resistance conductive layer 600, the upper layer 602 and the lower layer 601 is etched to form separated two ohmic contact layers 55 and 56 around the gate electrode 26 while exposing the semiconductor layer 40 over the gate electrode 26. According to an embodiment of the present invention, an oxygen plasma process is further performed to stabilize the surface of the exposed semiconductor layer 40.

Figure 8A:
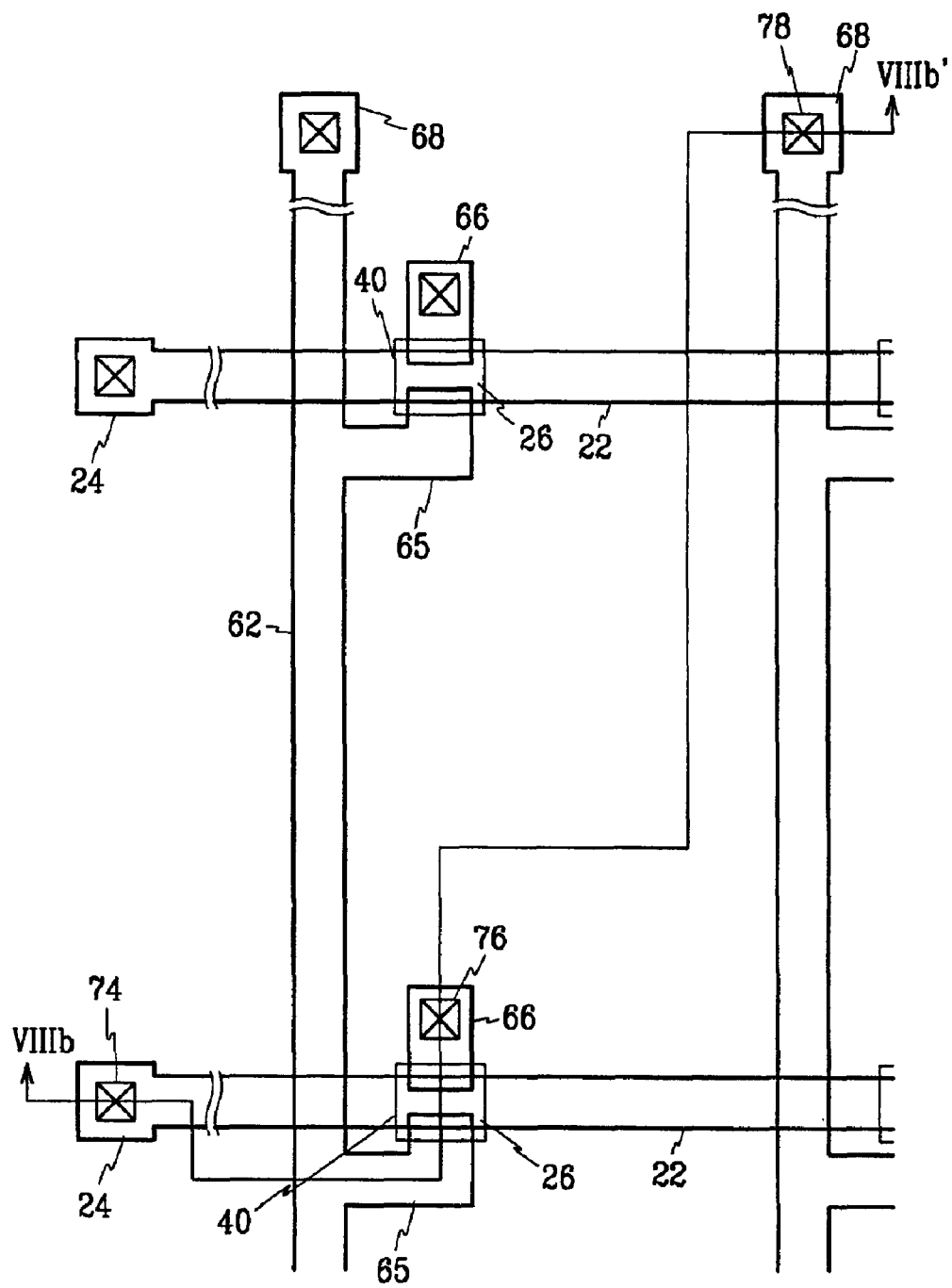
Figure 8B:
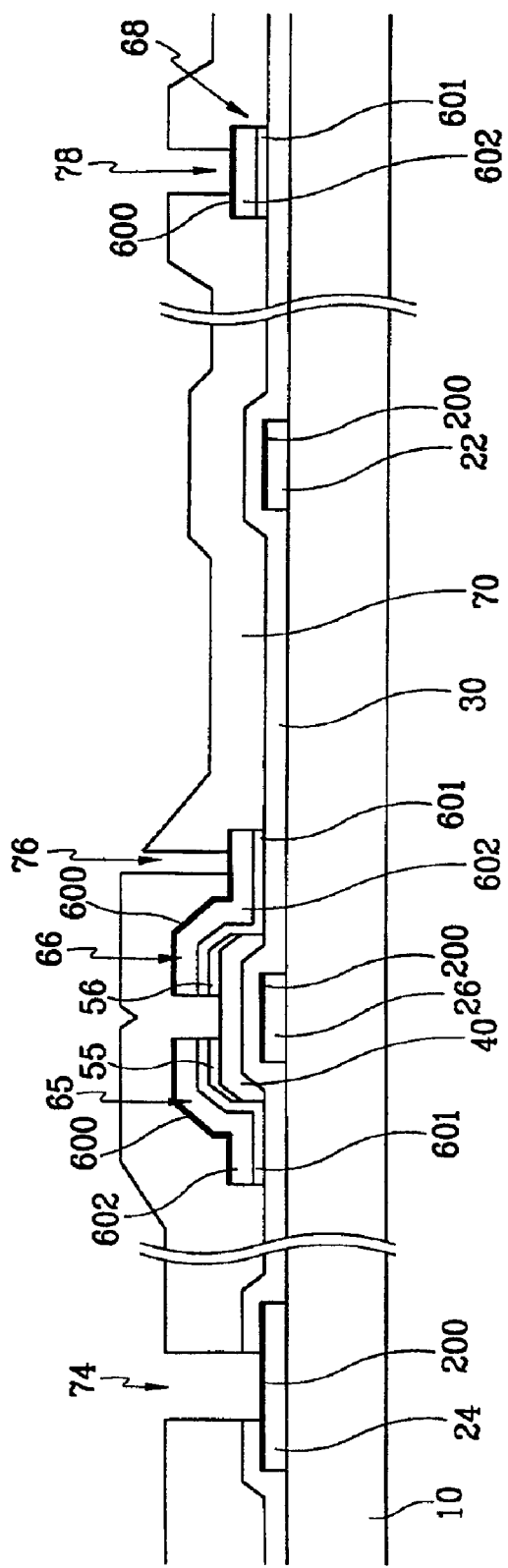
FIG. 8B is a cross sectional view of the thin film transistor array panel taken along the VIIIb–VIIIb' line of FIG. 8A.

Next, referring to FIGS. 8A and 8B, a protective layer 70 is formed onto the substrate 10 with silicon nitride or an organic insulating material, and patterned together with the gate insulating layer 30 through dry etching until the first and second low resistance conductive layers 200 and 600 are exposed to thereby form contact holes 74, 76, and 78 exposing the first and second low resistance conductive layers 200 and 600 over the gate pads 24, the drain electrodes 66 and the data pads 68.

Finally, referring back to FIGS. 1 and 2, a transparent layer such as an IZO layer is deposited onto the substrate 10, and patterned using a mask to thereby form pixel electrodes 82, and subsidiary gate and data pads 86 and 88. The pixel electrodes 82 are electrically connected to the drain electrodes 66 while contacting the second low resistance conductive layer 600 over the drain electrodes 66 through the contact holes 76. The subsidiary gate and data pads 86 and 88 are electrically connected to the first and second low resistance conductive layers 200 and 600 over the gate pads 24 and the data pads 68 through the contact holes 74 and 78.

As described above, the first and second low resistance conductive layers 200 and 600 having nitrogen are deposited onto the gate line assembly and the data line assembly, respectively, without a break in vacuum, thereby preventing air exposure and the forming of a high resistance layer such as an aluminum oxide layer on the conductive layer. Accordingly, the thin film transistor array panel according to an embodiment of the present invention can be fabricated without affect from variations in the processing conditions. The connection of the pixel electrode 82 to the drain electrode 66 is made by interposing the second low resistance conductive layer 600 while minimizing the contact resistance at the contact area. In this way, the contact area including the pad portions operates reliability.

The above-decreased process can also be made using four masks. The four mask-based processing will now be explained with reference to FIGS. 9 to 11.

Figure 9:
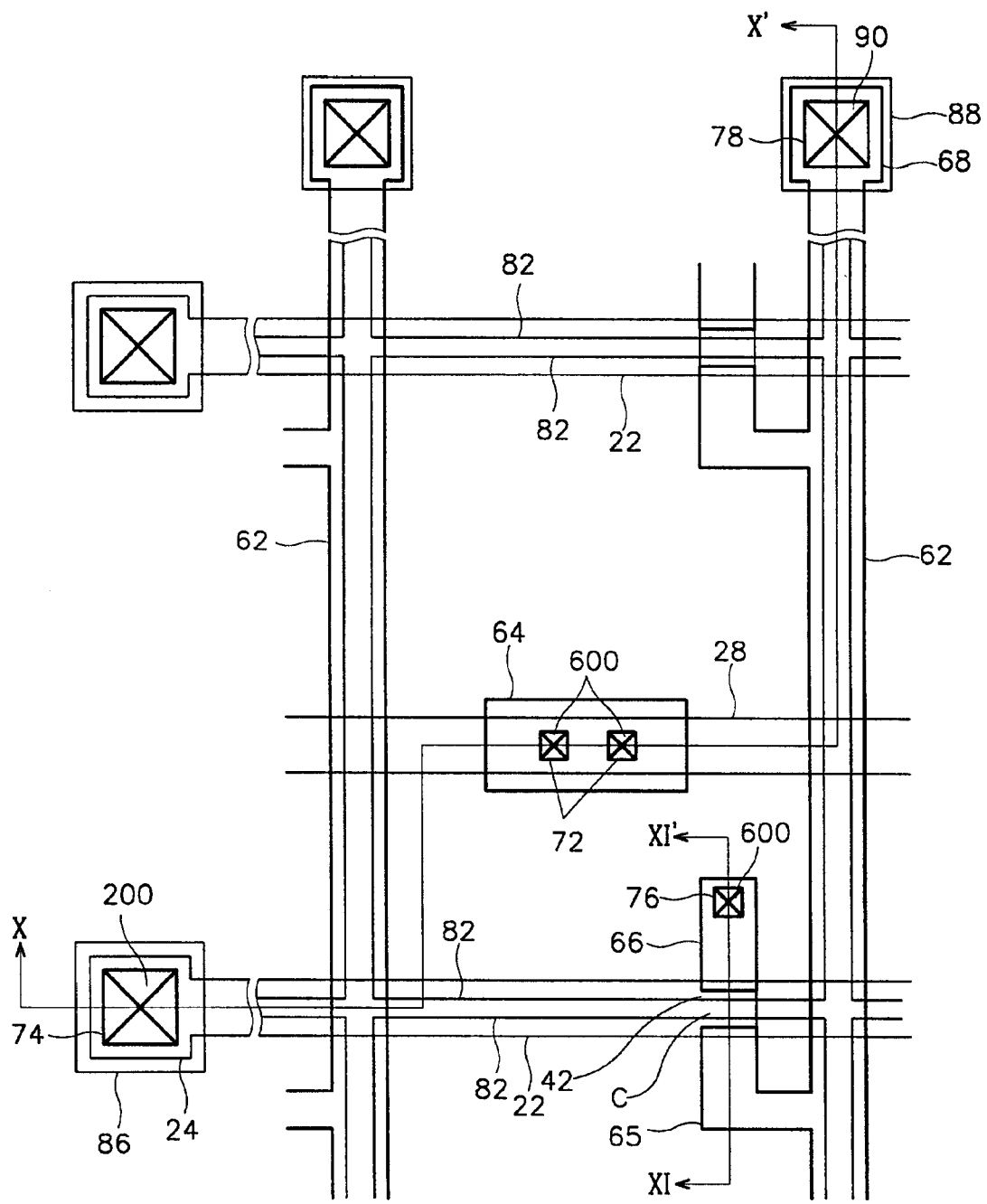
FIG. 9 is a plan view of a thin film transistor array panel for a liquid crystal display according to another preferred embodiment of the present invention.
Figure 10:
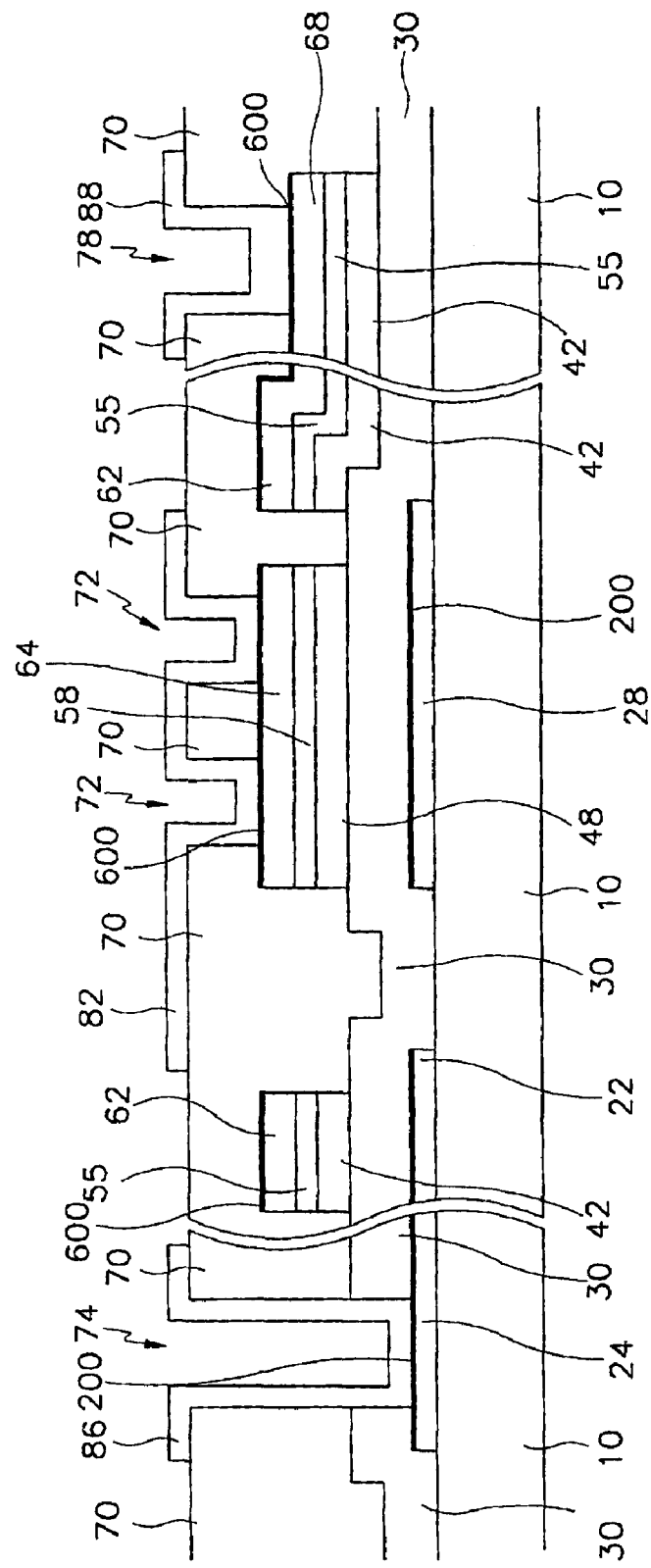
FIGS. 10 and 11 are cross sectional views of the thin film transistor array panel taken along the X–X' line and the XI–XI' line of FIG. 9, respectively.
Figure 11:
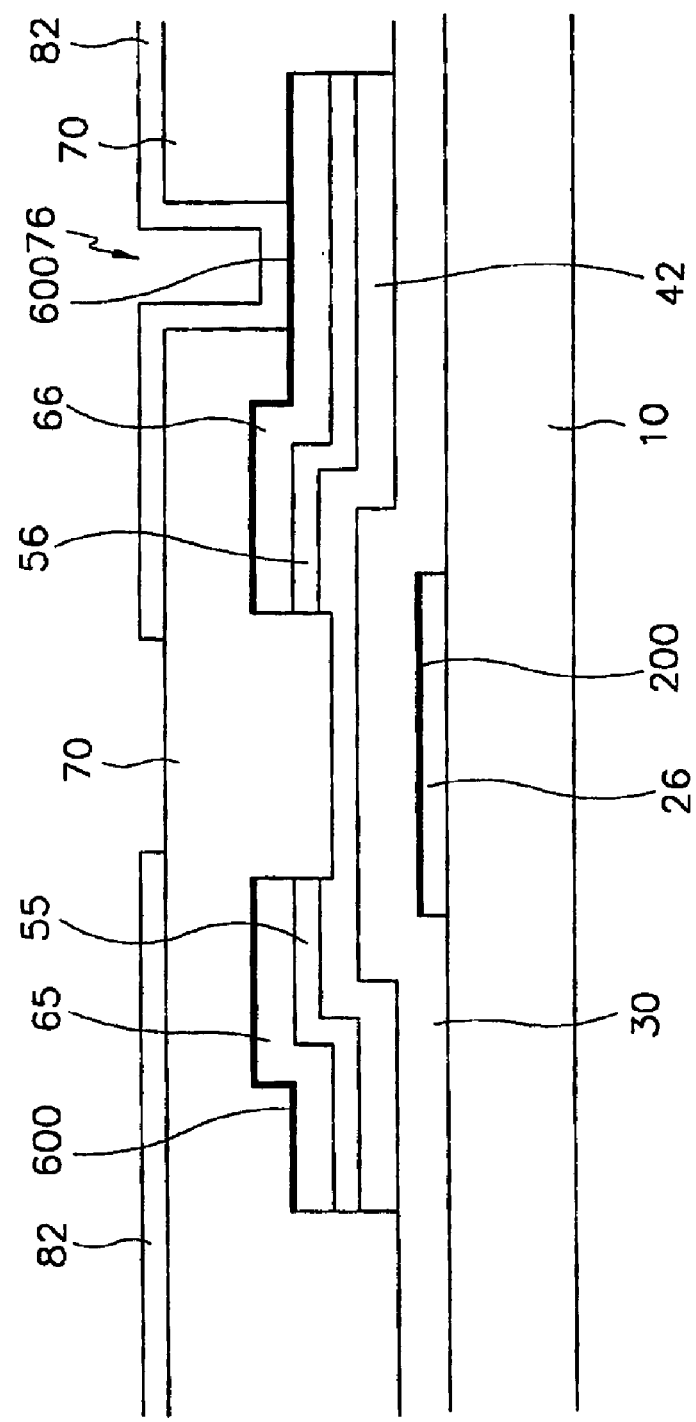

FIG. 9 is a plan view of a thin film transistor array panel for a liquid crystal display according to another preferred embodiment of the present invention, and FIGS. 10 and 11 are cross sectional views of the thin film transistor array panel taken along the X–X' line and the XI–XI' line of FIG. 9.

Referring to FIG. 9, a gate line assembly is formed on an insulating substrate 10. According to an embodiment of the present invention, the gate assembly includes a first conductive layer having aluminum, aluminum alloy, or aluminum/neodymium alloy. The gate line assembly further includes a second conductive layer having molybdenum or molybdenum alloy. The gate line assembly includes gate lines 22, gate pads 24, and gate electrodes 26. The gate line assembly further includes storage capacitor electrodes 28 proceeding parallel to the gate lines 22 to receive common electrode voltages from the outside. The storage capacitor electrodes 28 are overlapped with storage capacitor conductive patterns 64 connected to pixel electrodes 82 to be described later to thereby form storage capacitors for enhancing the electrical potential storage capacitance of the pixels. In case a sufficient storage capacitance is obtained by way of overlapping of the pixel electrodes 82 with the gate lines 22, the storage capacitor electrodes 28 can be omitted.

A first low resistance conductive layer 200 is formed on the gate line assembly. According to an embodiment of the present invention, the first low resistance conductive layer 200 is preferably formed of an aluminum/neodymium alloy nitride (Al/Nd/N) layer.

A gate insulating layer 30 is formed on the gate line assembly and the first low resistance conductive layer 200 with silicon nitride (SiNx).

Semiconductor patterns 42 and 48 are formed on the gate insulating layer 30 with hydrogenated amorphous silicon. Ohmic contact patterns 55, 56 and 58 are formed on the semiconductor patterns 42 and 48 with amorphous silicon where n-type impurities such as phosphorous P are doped in a high concentration.

A data line assembly is formed on the ohmic contact patterns 55, 56, and 58 with including aluminum or aluminum alloy. The data line assembly includes data lines 62 proceeding in the vertical direction, data pads 68 connected to the one-sided ends of the data lines 62 to receive image signals from the outside, source electrodes 65 connected to the data lines 62, and drain electrodes 66 separated from the source electrodes 65 around the gate electrodes 26 or the thin film transistor channel portions C. The storage capacitor conductive patterns 64 are formed over the storage capacitor electrodes 28. In case the storage capacitor electrodes 28 are absent, the storage capacitor conductive patterns 64 are also omitted.

A second low resistance conductive layer 600 is formed on the data line assembly with a low resistance conductive material such as aluminum or aluminum alloy, and nitrogen.

The data line assembly can have a single-layered structure, or a double-layered structure having a lower layer based on chrome, molybdenum or molybdenum alloy, and an upper layer based on aluminum or aluminum alloy.

The ohmic contact patterns 55, 56, and 58 lower the contact resistance between the underlying semiconductor patterns 42 and 48 and the overlying data line assembly while having the similar shape as the data line assembly. That is, the data line ohmic contact pattern 55 has the similar shape as the data lines 62, the data pads 68, and the source electrodes 65, the ohmic contact pattern 56 has the similar shape as the drain electrodes 66, and the ohmic contact pattern 58 has the similar shape as the storage capacitor conductive pattern 64.

The semiconductor patterns 42 and 48 have the similar shape as the data line assembly and the ohmic contact patterns 55, 56, and 57 except for the thin film transistor channel portions C. Specifically, the storage capacitor semiconductor pattern 48, the storage capacitor conductive pattern 64, and the storage capacitor ohmic contact pattern 58 have the similar shape, but the thin film transistor semiconductor pattern 42 differs in shape from the data line assembly and the remaining ohmic contact patterns. That is, the source and the drain electrodes 65 and 66 as well as the data line ohmic contact pattern 55 and the drain electrode ohmic contact pattern 56 are separated from each other at the thin film transistor channel portion C, but the thin film transistor semiconductor pattern 42 continuously proceeds at that portion without separation while forming the thin film transistor channel.

A protective layer 70 is formed over the data line assembly while covering the second low resistance conductive layer 600. The protective layer 70 has contact holes 76, 78, and 72 exposing the second low resistance conductive layer 600 over the drain electrodes 66, the data pads 68, and the storage capacitor conductive patterns 64, respectively, and contact holes 74 exposing the first low resistance conductive layer 200 over the gate pads 24 together with the gate insulating layer 30. According to embodiment of the present invention, the protective layer 70 is preferably formed with silicon nitride or an acryl-based organic insulating material.

Pixel electrodes 82 are formed on the protective layer 70 to receive image signals from the thin film transistors and generate electric fields together with common electrode (not shown) formed at a counter substrate (not shown). The pixel electrodes 82 are formed with a transparent conductive material such as IZO. The pixel electrodes 82 are electrically connected to the drain electrodes 66 through the contact holes 76 via the second low resistance conductive layer 600 to receive image signals. Furthermore, the pixel electrodes 82 are overlapped with the neighboring gate lines 22 and data lines 62 to enhance the opening ratio. Alternatively, the overlapping can be omitted. The pixel electrodes 82 are electrically connected to the storage capacitor conductive patterns 64 through the contact holes 72 via the second low resistance conductive layer 600 to transmit image signals thereto. Subsidiary gate and data pads 84 and 88 are formed over the gate and the data pads 24 and 68, respectively, such that they are connected to the gate and the data pads 24 and 68 through the contact holes 74 and 78 via the first and second low resistance conductive layers 200 and 600. The subsidiary gate and data pads 84 and 88 have a role of enhancing the adhesion of the gate and data pads 24 and 68 to external circuits while protecting the gate and data pads 24 and 68. According to an embodiment of the present invention, the subsidiary gate and data pads 84 and 88 can be selectively omitted.

According to an embodiment of the present invention, in the case of a reflective type liquid crystal display, the pixel electrodes 82 can be formed with an opaque conductive material.

A method of fabricating the liquid crystal display using four mask is described with reference to FIGS. 12A to 18C as well as FIGS. 9 to 11.

Figure 12A:
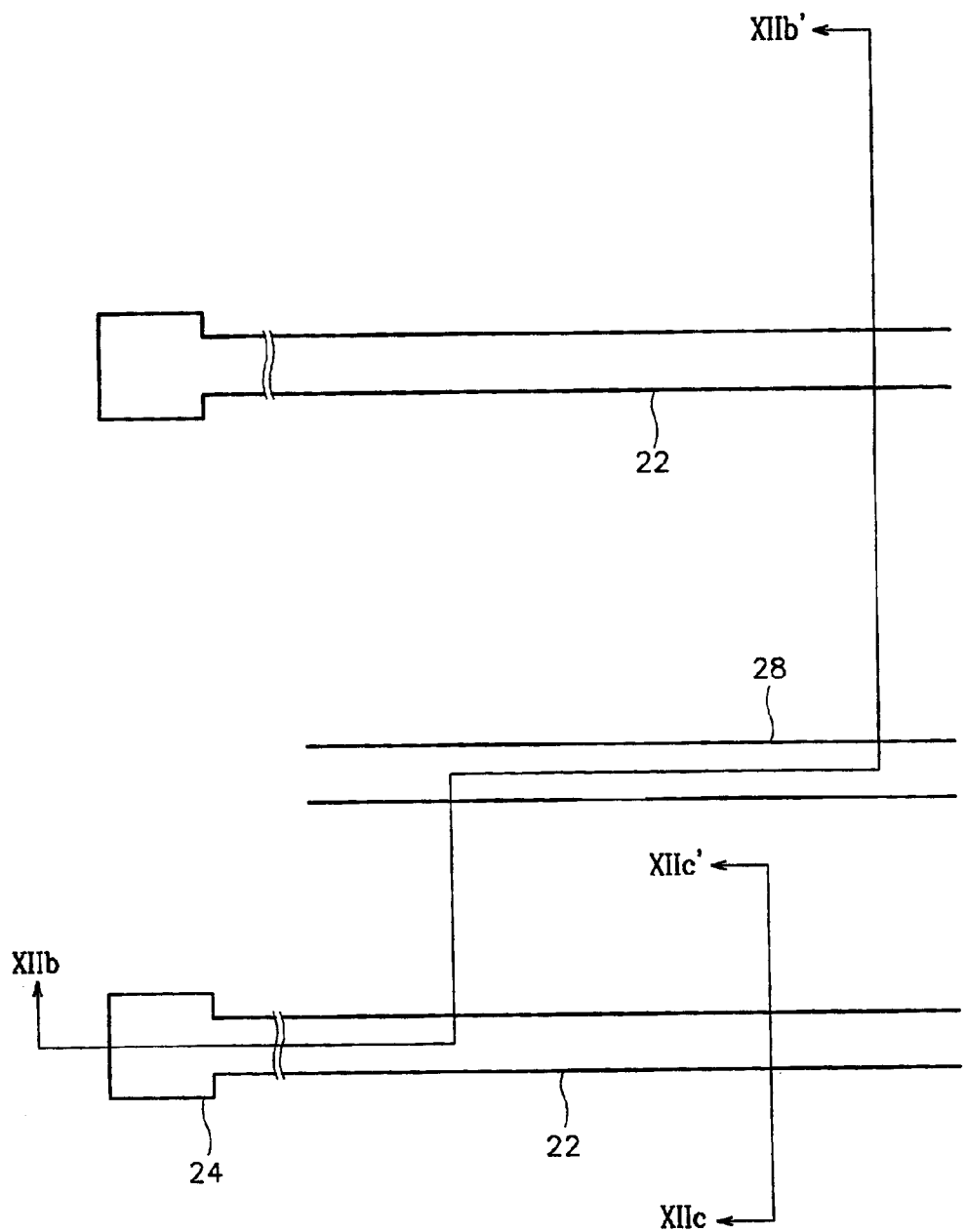
FIG. 12A illustrates the first step of fabricating the thin film transistor array panel shown in FIG. 9.
Figure 12B:
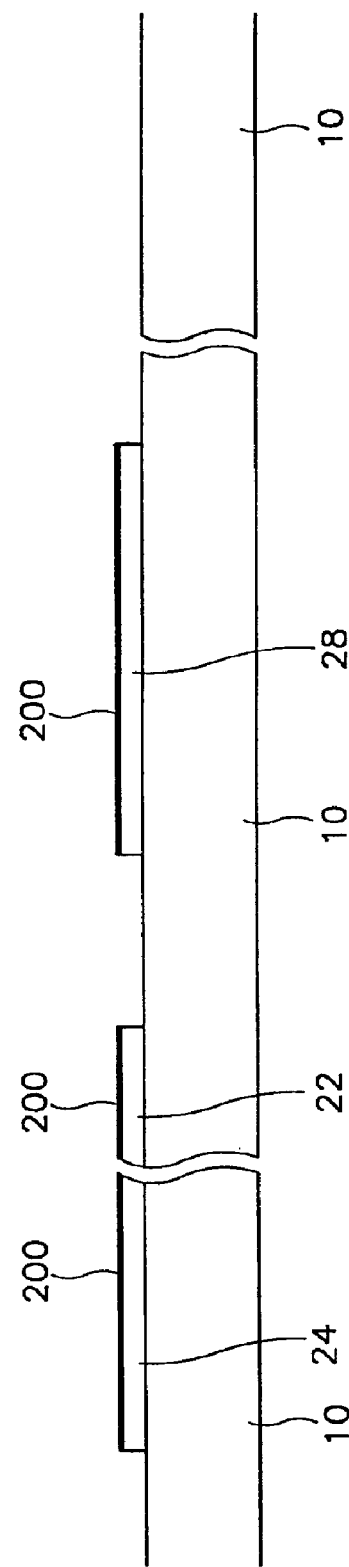
FIGS. 12B and 12C are cross sectional views of the thin film transistor array panel taken along the XIIb–XIIb' line and the XIIc–XIIc' line of FIG. 12A, respectively.
Figure 12C:
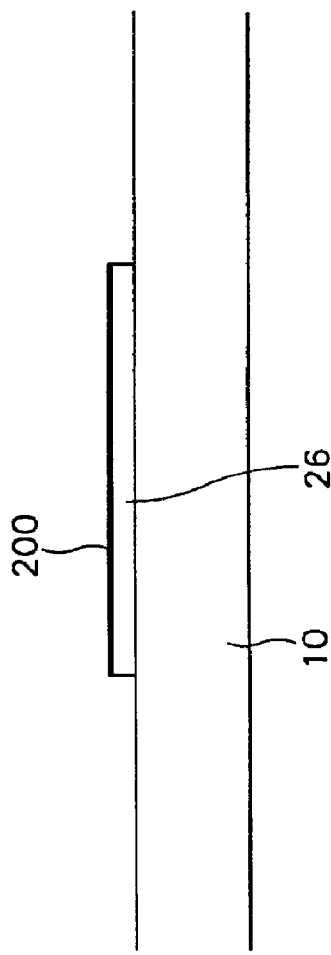

Referring to FIGS. 12A to 12C, a gate line assembly conductive layer and a first low resistance conductive layer 200 are sequentially deposited onto a substrate 10, and patterned through photolithography using a first mask (not shown) to thereby form a gate line assembly overlaid with a first low resistance conductive layer 200. The gate line assembly includes gate lines 22, gate pads 24, gate electrodes 26, and storage capacitor electrodes 28.

Figure 13A:
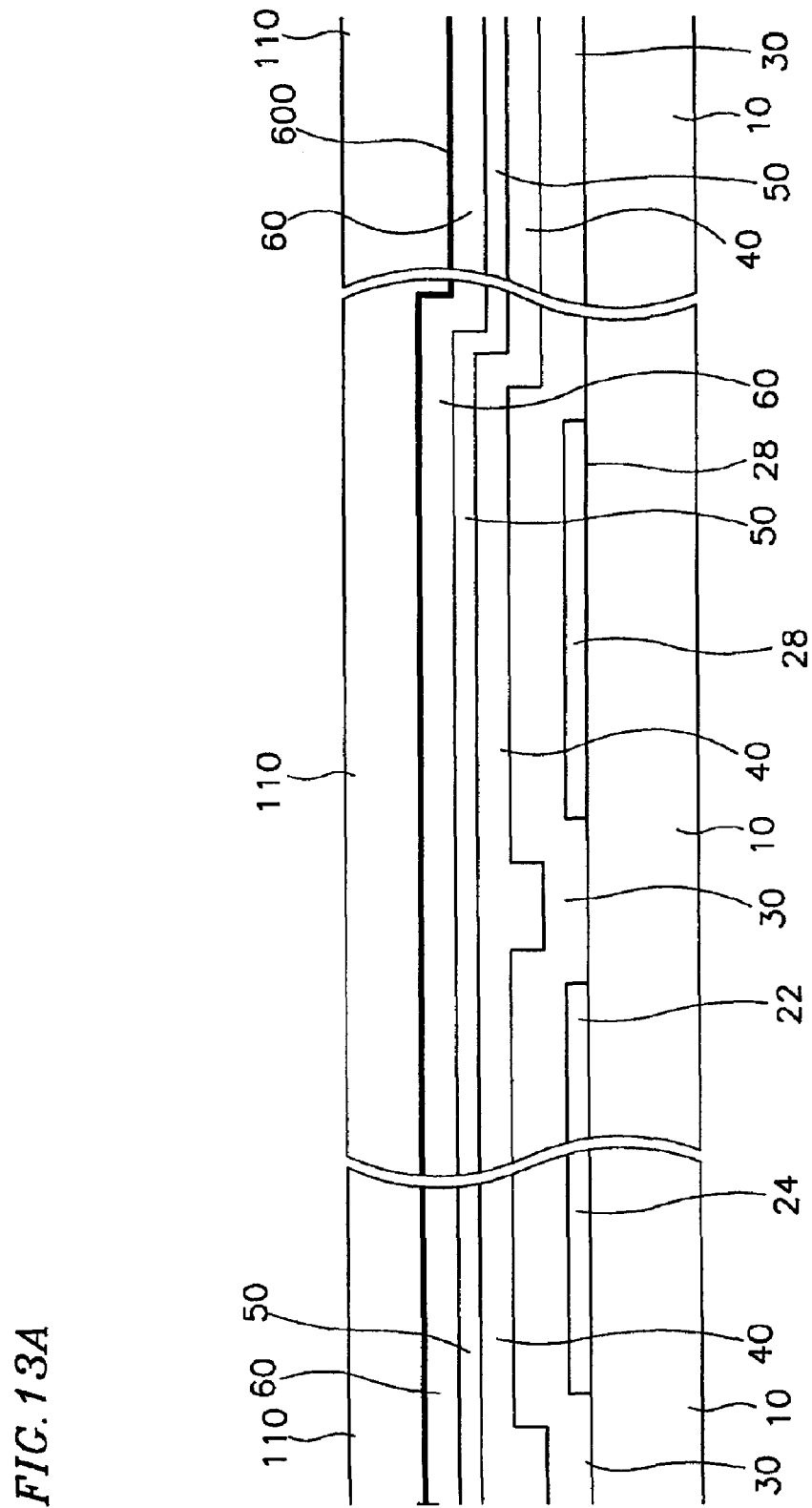
FIGS. 13A and 13B illustrate the step of fabricating the thin film transistor array panel following the step illustrated in FIG. 12A.
Figure 13B:
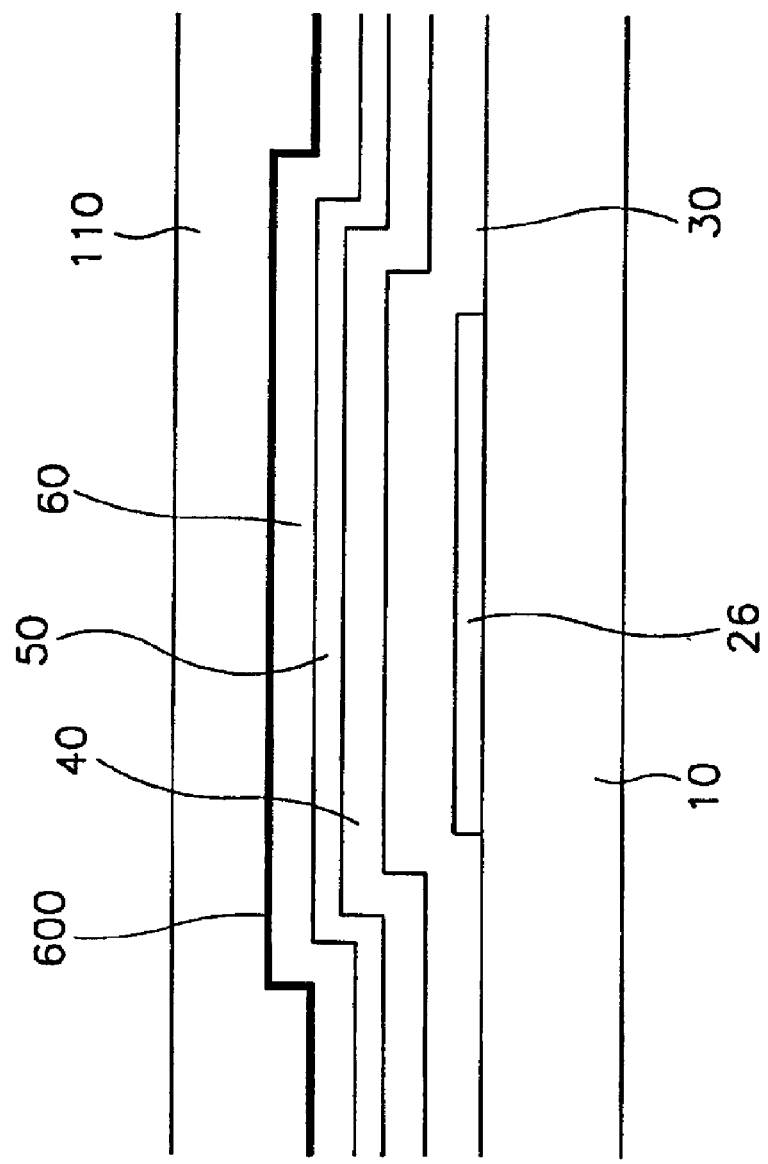

Thereafter, referring to FIGS. 13A and 13B, a gate insulating layer 30 having a thickness of about 1500 Å to about 5000 Å, a semiconductor layer 40 having a thickness of about 500 Å to 2000 Å and a doped amorphous silicon layer 50 having a thickness of about 300 Å to about 600 Å are sequentially deposited onto the substrate 10 through chemical vapor deposition. A data line assembly conductive layer 60 such as aluminum or aluminum alloy, and a second low resistance conductive layer 600 are sequentially deposited on the doped amorphous silicon layer 50 through sputtering. A photoresist film 110 is then coated onto the low resistance conductive layer having a thickness of about 1 $\mu$m to about 2 $\mu$m.

Figure 14A:
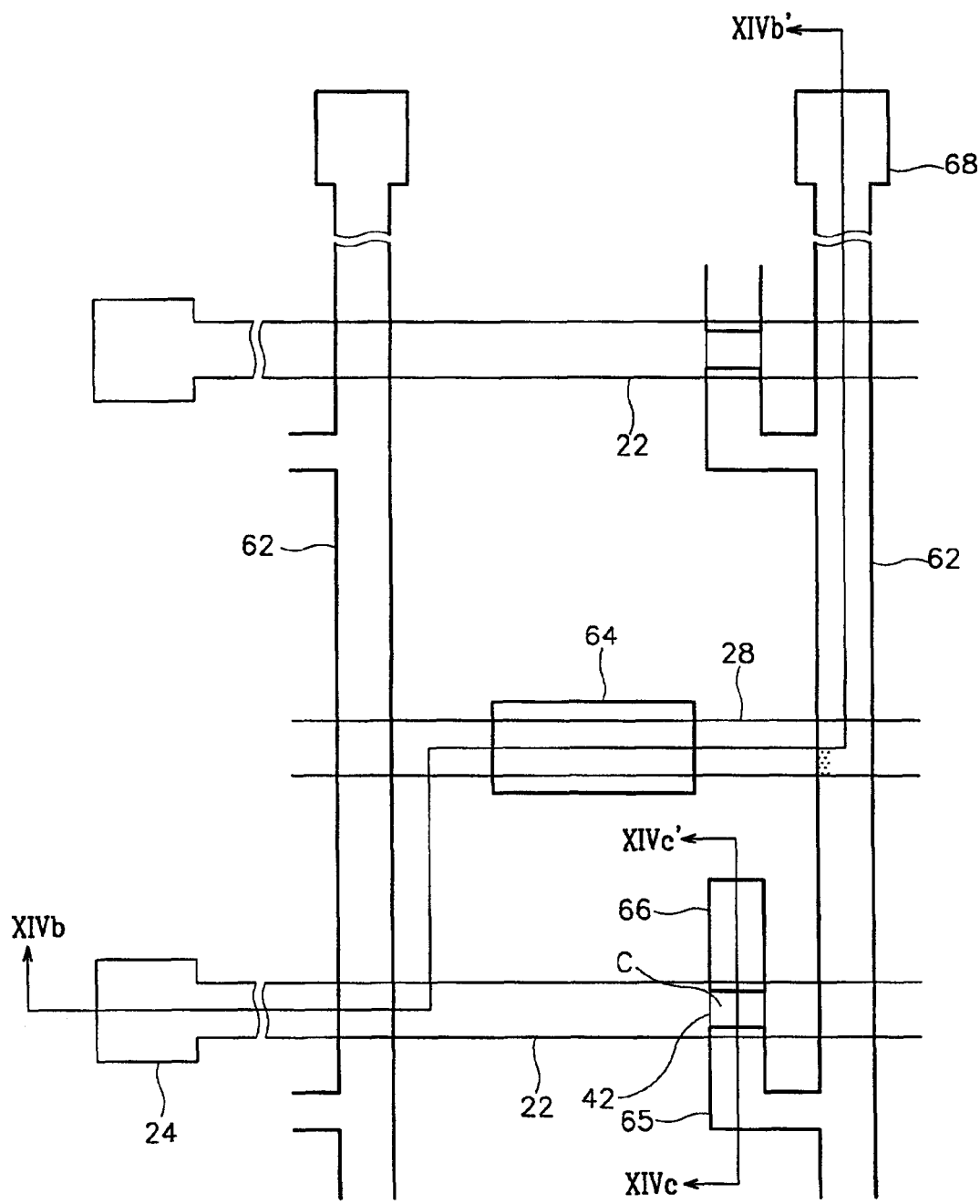
FIG. 14A illustrates the step of fabricating the thin film transistor array panel following the step illustrated in FIGS. 13A and 13B.
Figure 14B:
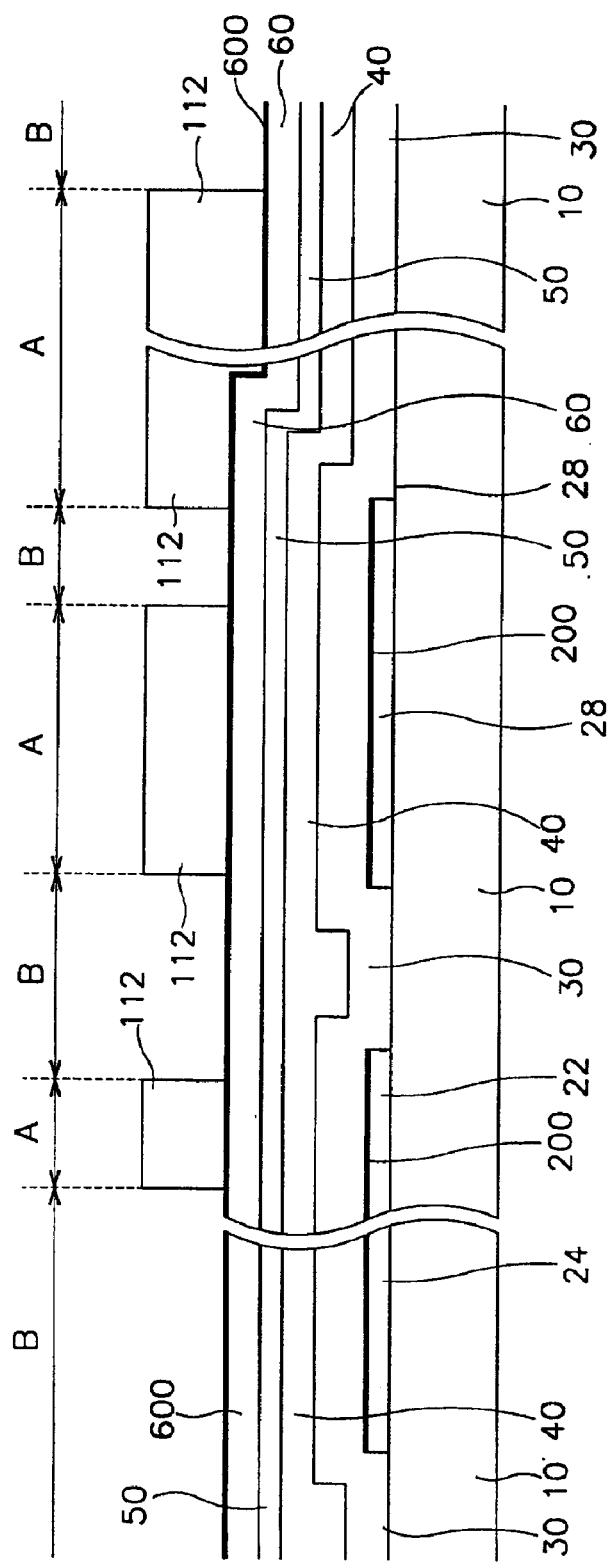
FIGS. 14B and 14C are cross sectional views of the thin film transistor array panel taken along the XIVb–XIVb' line and the XIVc–XIVc' line of FIG. 14A, respectively.
Figure 14C:
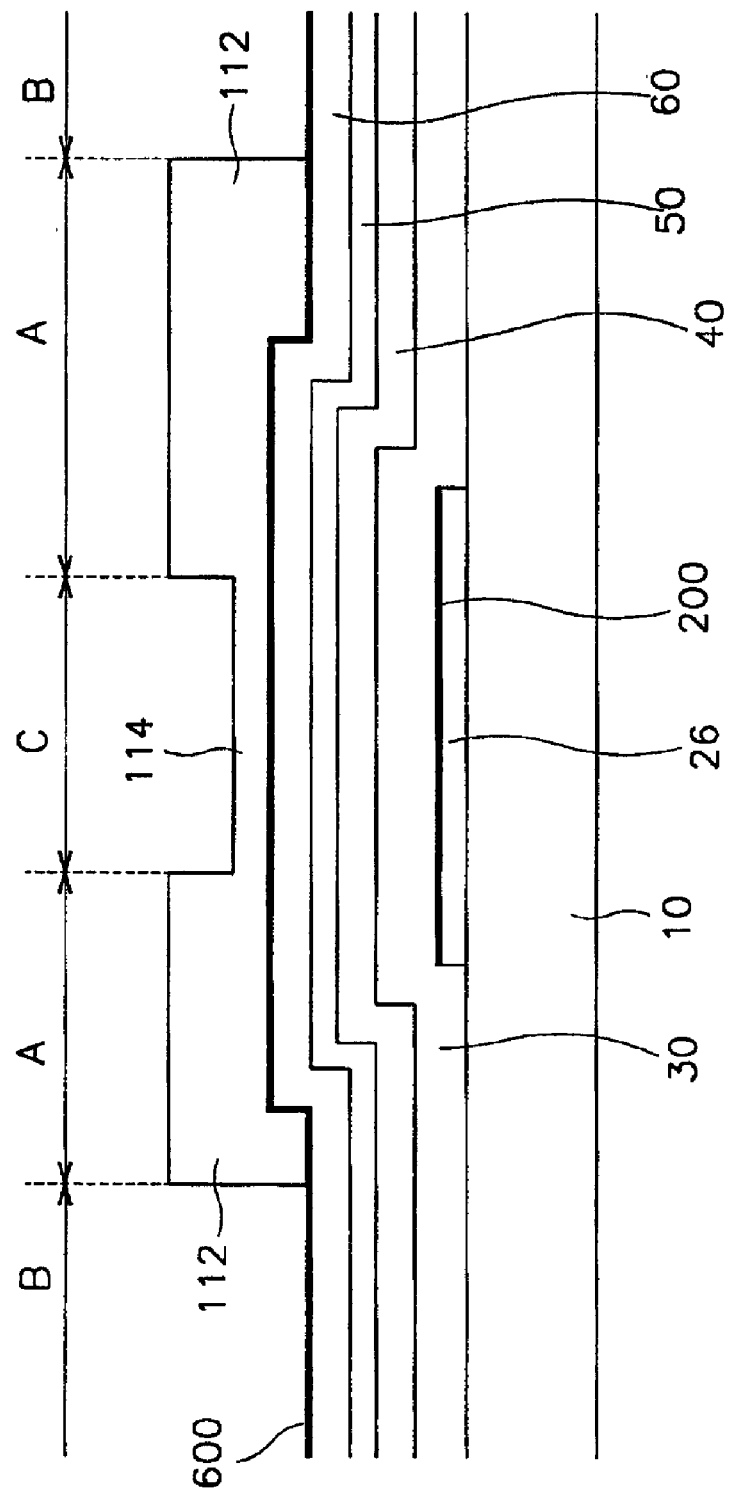

Referring to FIGS. 14B and 14C, the photoresist film 110 is exposed to light through a second mask, and developed to thereby form a photoresist pattern with first and second photoresist pattern portions 114 and 112. The first photoresist pattern portion 114 placed at a thin film transistor channel area C between source and drain electrodes 65 and 66 is established to have a thickness smaller than that of the second photoresist pattern portion 112 placed at a data line assembly area A. The photoresist film 110 (FIGS. 13A and 13B) placed at the remaining area B is all removed. The thickness ratio of the first photoresist pattern portion 114 to the second photoresist pattern portion 112 should be controlled depending upon the processing conditions in the subsequent etching process. According to an embodiment of the present invention, the thickness of the first photoresist pattern portion 114 is preferably formed to be about ½ or less of that of the second photoresist pattern portion 112. For instance, the thickness of the first photoresist pattern portion 114 can be formed to be about 4000 Å or less.

According to an embodiment of the present invention, to differentiate the thickness of the photoresist film 110, various masks can be used. The masks include a slit, a lattice pattern, or a semitransparent film to control an amount of light transmission.

In the case of using the slit or lattice pattern, it is preferable that the width of slit or lattice should be smaller than the light decomposition capacitance of a light exposure apparatus. In the case of using the semitransparent film, the semitransparent film can have at least two thin films having different light transmission or thickness to control light transmission rate.

When the photoresist film is exposed to light through the mask, the high molecules of the photoresist film 110 entirely exposed to light are completely decomposed. Those of the photoresist film corresponding to the slit pattern or the semitransparent film of the mask are decomposed at some degree, and those of the photoresist film blocked from the mask are not decomposed. When the photoresist film 110 after exposing to the light is developed, the portions where the high molecules are not decomposed are left over while being differentiated in thickness depending upon the degree of molecular decomposition. In case the light exposing time is long, all the molecules of the photoresist film can be decomposed.

Alternatively, the first photoresist pattern portion 114 having a relatively thin thickness can be formed using a photoresist film capable of reflow. The photoresist film is exposed to light through a usual mask with a light transmission portion and a light interception portion. The light-exposed photoresist film is then developed, and made the reflow such that the film portion is partially flown to the non-film area.

The first photoresist pattern portion 114, the underlying second low resistance conductive layer 600, the data line assembly conductive layer 60, the doped amorphous silicon layer 50, and the semiconductor layer 40 are then etched. At this time, the data line assembly conductive layer 60 and the underlying layers are left over at the data line assembly area A, only the semiconductor layer 40 is left over at the channel area C, and the data line assembly conductive layer 60, the doped amorphous silicon layer 50, and the semiconductor layer 40 are all removed at the remaining area B while exposing the underlying gate insulating layer 30.

Figure 15A:
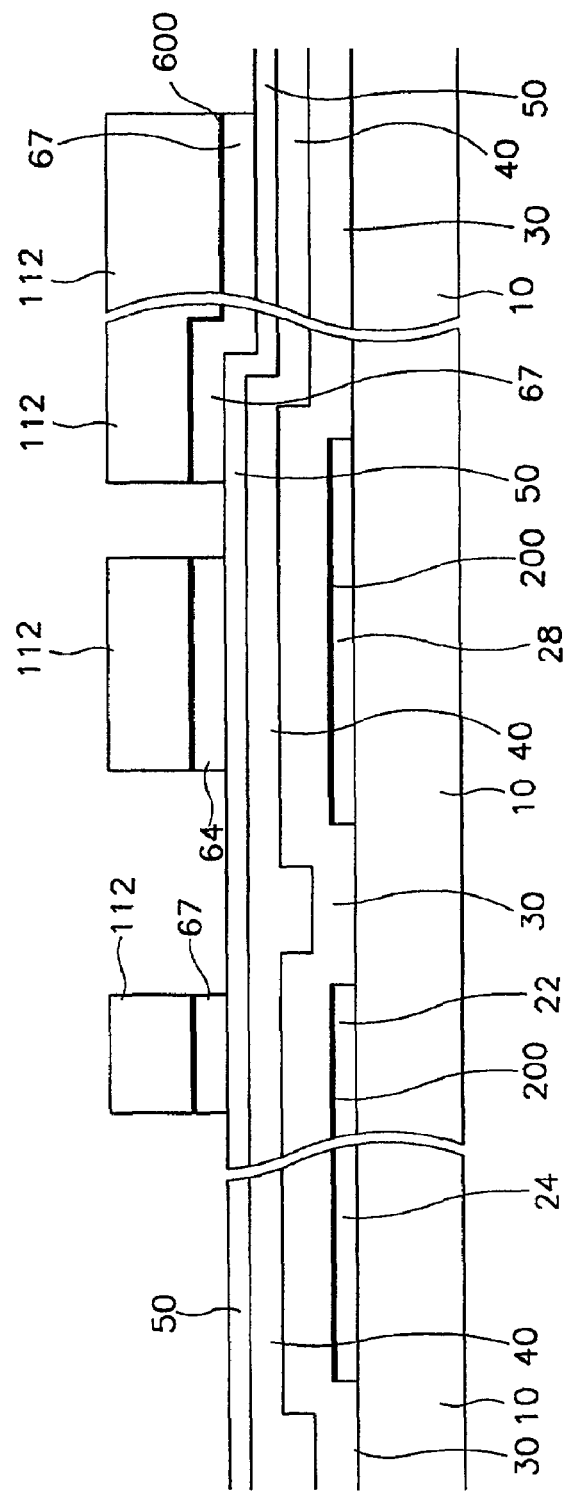
FIGS. 15A and 15B illustrate the step of fabricating the thin film transistor array panel following the step illustrated in FIG. 14A.
Figure 15B:
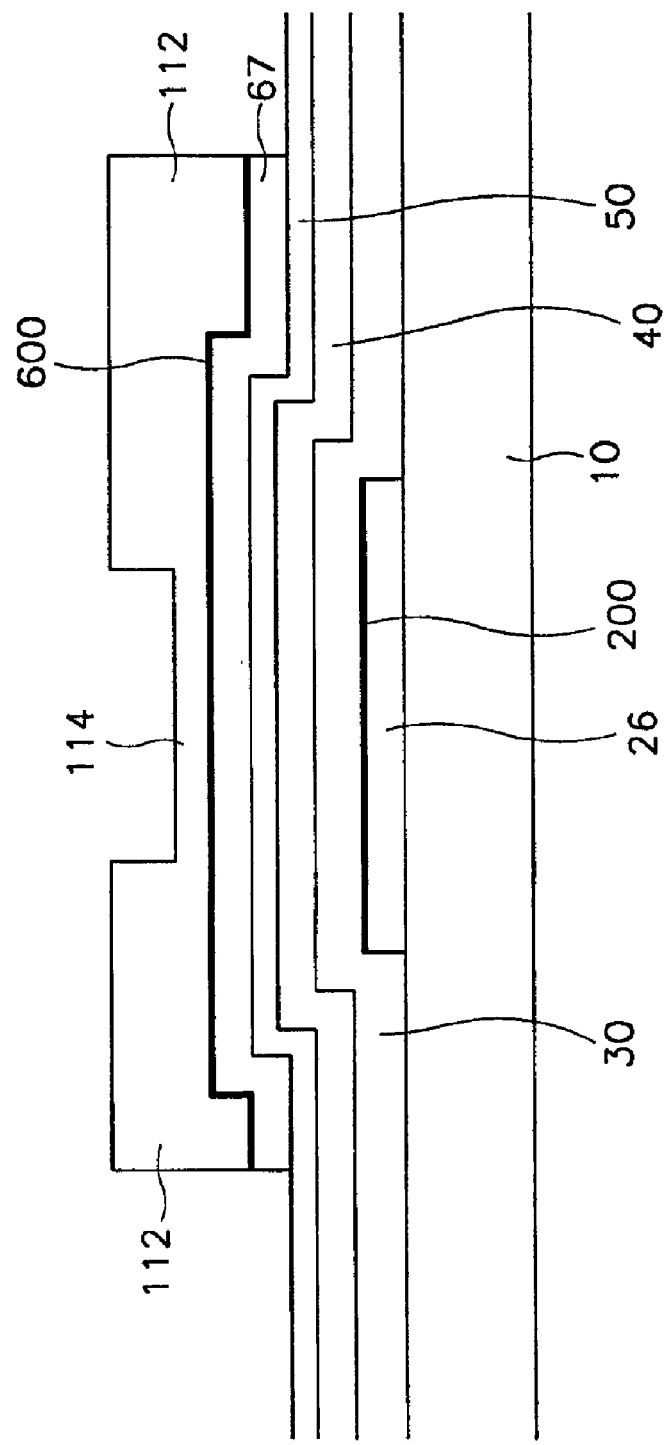

First, referring to FIGS. 15A and 15B, the second low resistance conductive layer 600 and the data line assembly conductive layer 60 exposed at the B area are removed while exposing the underlying doped amorphous silicon layer 50. According to an embodiment of the present invention, dry etching or wet etching can be used when the second low resistance conductive layer 600 and the data line assembly conductive layer 60 are etched. During the etching process, the photoresist pattern portions 112 and 114 are not etched. However, when the data line assembly conductive layer 60 is formed with chrome (Cr), wet etching is preferably used. According to an embodiment of the present invention, wet etching solution including $CeNHO_3$ is preferably used for etching the Cr-based conductive layer 60. For the dry etching for the Mo or MoW-based conductive layer 60, a mixture gas such as $CF_4$ and HCl or $CF_4$ and $O_2$ is preferably used as an etching gas. In the latter case, the etching rates thereof with respect to the photoresist film are nearly the same.

Consequently, as shown in FIGS. 15A and 15B, a source/drain conductive pattern 67, a storage capacitor conductive pattern 64 and a second low resistance conductive layer 600 at the channel area C and the data line assembly area A are left over, whereas a conductive layer 60 and a second low resistance conductive layer 600 at the B area are all removed while exposing the underlying doped amorphous silicon layer 50. At this time, the conductive patterns 67 and 64 have a similar shape as the data line assembly except that source and the drain electrodes 65 and 66 are not yet separated from each other. Furthermore, when the dry etching is performed, the photoresist pattern portions 112 and 114 are also removed at some degree.

Figure 16A:
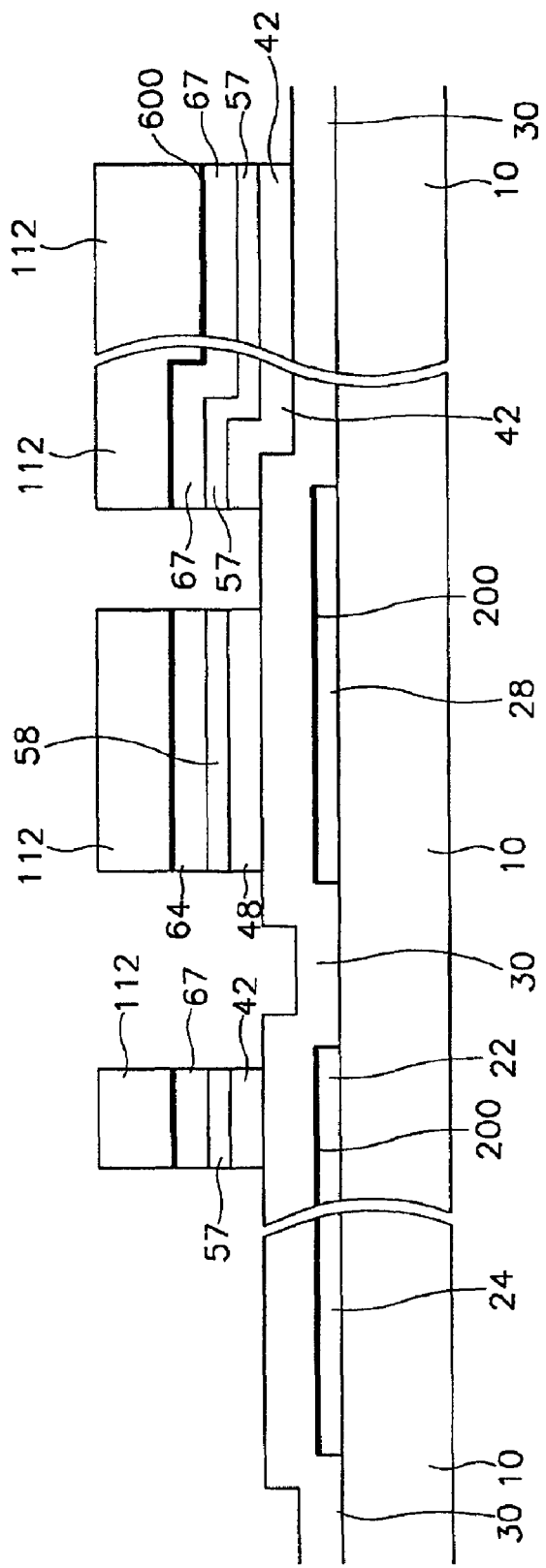
FIGS. 16A and 16B illustrate the step of fabricating the thin film transistor array panel following the step illustrated in FIGS. 15A and 15B.
Figure 16B:
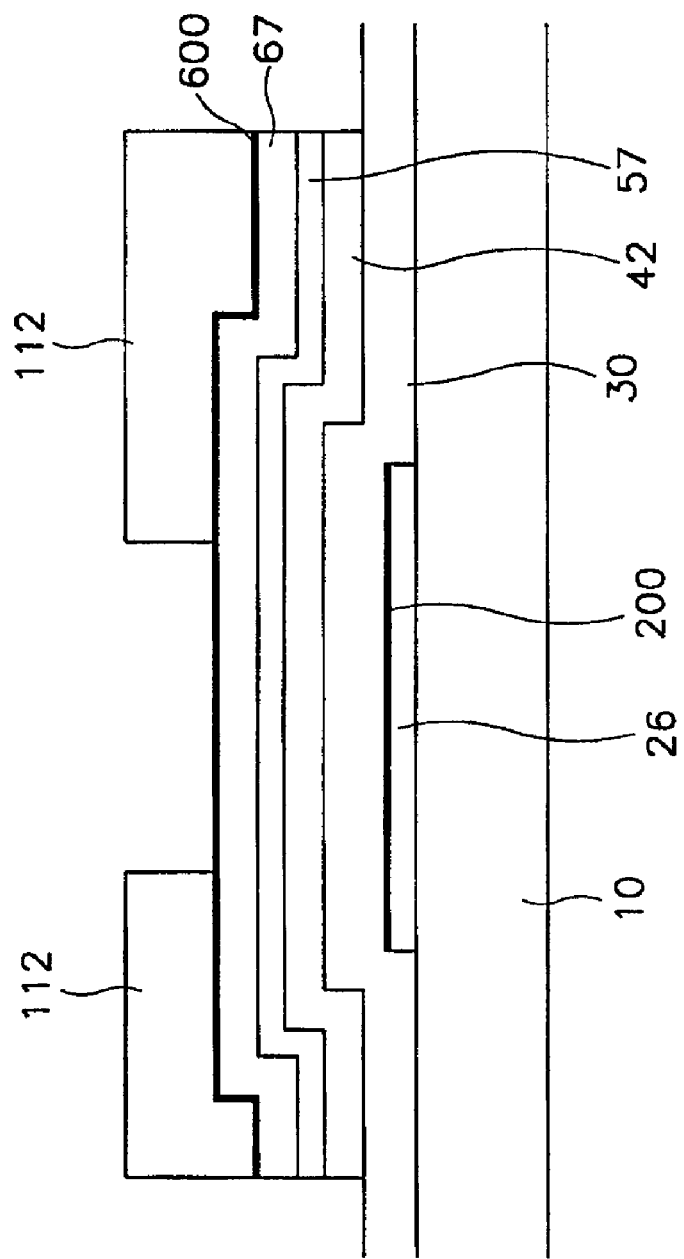

Referring to FIGS. 16A and 16B, the doped amorphous silicon layer 50 (FIGS. 15A and 15B) exposed at the B area and the underlying semiconductor layer 40 are simultaneously removed through dry etching together with the first photoresist pattern portion 114. At this time, the photoresist pattern portions 112 and 114, the doped amorphous silicon layer 50, and the semiconductor layer 40 (the ohmic contact layer and the semiconductor layer having no etching selectivity) are simultaneously etched, whereas the gate insulating layer 30 is not etched. According to an embodiment of the present invention, the etching rates with respect to the photoresist patterns 112 and 114 and the semiconductor layer 40 are preferably similar. When a mixture gas of $SF_6$ and HCl or $SF_6$ and $O_2$ is used as the etching gas, it is possible to etch the photoresist pattern 112 (or 114) and the semiconductor layer 40 by substantially the same thickness. When the etching rates with respect to the photoresist patterns 112 and 114 and the semiconductor layer 40 are the same or substantially the same, the thickness of the first photoresist pattern 114 is preferably the same as or less than the sum in thickness of the semiconductor layer 40 and the doped amorphous silicon layer 50.

Consequently, as shown in FIGS. 16A and 16B, the first photoresist pattern portion 114 at the channel area C is removed while exposing the second low resistance conductive layer 600 over the source/drain conductive pattern 67. The doped amorphous silicon layer 50 and the semiconductor layer 40 at the B area are removed while exposing the underlying gate insulating layer 30. Meanwhile, as the second photoresist pattern portion 112 at the data line assembly area A is also etched, the thickness thereof becomes thinner. Furthermore, in this process, semiconductor patterns 42 and 48 are formed. Reference numeral 57 indicates doped amorphous silicon layer pattern under the source/drain conductive pattern 67 and the storage capacitor conductive pattern 64, respectively.

The photoresist residue on the second low resistance conductive layer 600 over the source/drain conductive pattern 67 at the channel area C is removed through ashing.

Figure 17A:
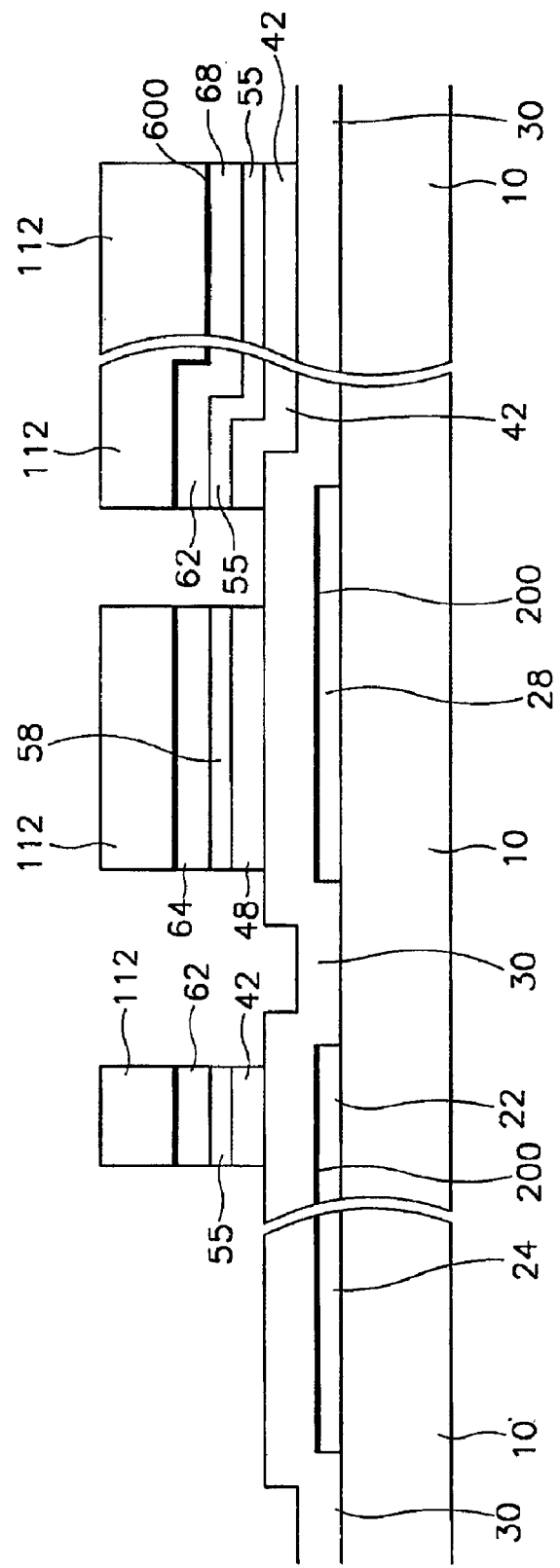
FIGS. 17A and 17B illustrate the step of fabricating the thin film transistor array panel following the step illustrated in FIGS. 16A and 16B.
Figure 17B:
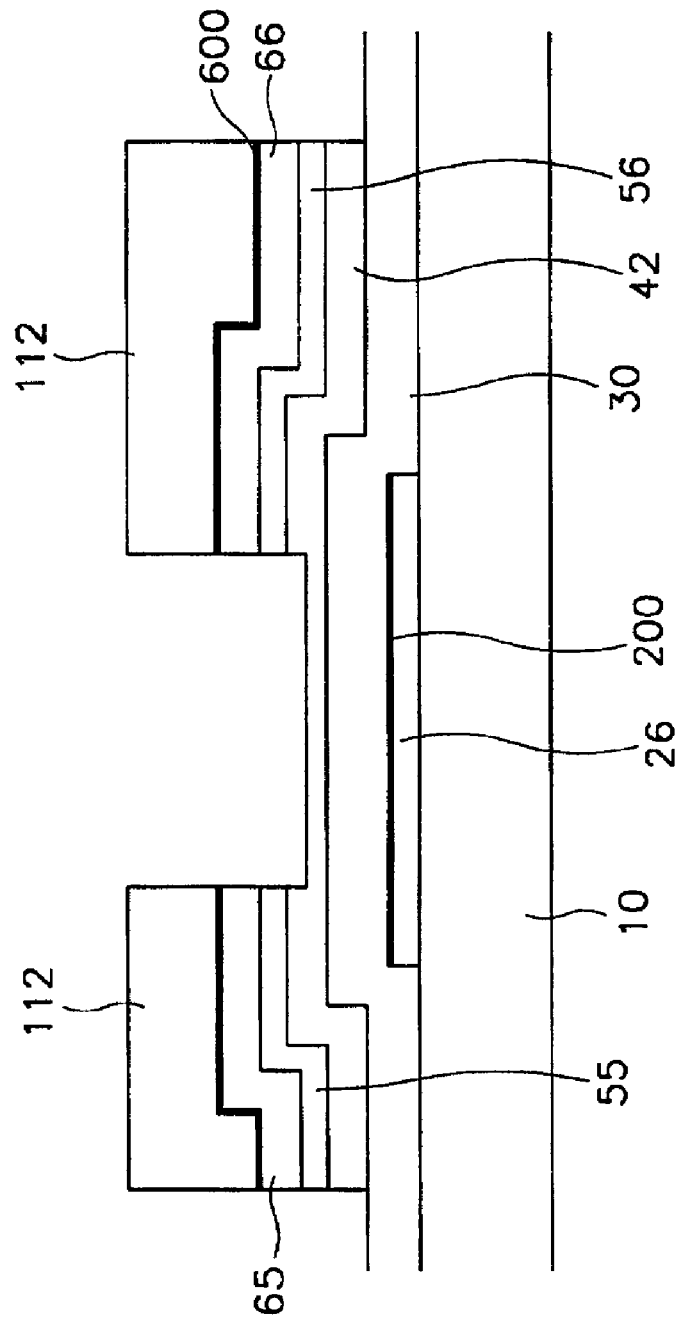

Referring to FIGS. 17A and 17B, the second low resistance conductive layer 600, the source/drain conductive pattern 67 and the doped amorphous silicon layer pattern 57 are removed through etching using second photoresist patterns 112 as masks. According to an embodiment of the present invention, dry etching is performed with respect to both of the source/drain conductive pattern 67 and the doped amorphous silicon layer pattern 57. It is also possible that wet etching is performed with respect to the source/drain conductive pattern 67, and dry etching with respect to the doped amorphous silicon layer pattern 57. In the former case, it is preferable that the etching selectivity of the source/drain conductive pattern 67 to the doped amorphous silicon layer pattern 57 is high. In case the etching selectivity is not great, it becomes difficult to find the end point of etching and to control the thickness of the semiconductor pattern 42 left over at the channel area. For the dry etching, a mixture gas of $SF_6$ and $O_2$ is preferably used as the etching gas for the source/drain conductive pattern 67. A mixture gas of $CF_4$ and HCl or $CF_4$ and $O_2$ can be preferably used as the etching gas for the doped amorphous silicon layer pattern 57 and the semiconductor pattern 42. When the mixture gas of $CF_4$ and $O_2$ is used for the etching gas, the semiconductor pattern 42 can have a uniform thickness. At this time, as shown in FIG. 17B, the semiconductor pattern 42 is partially removed through the etching, and the second photoresist pattern portions 112 is also etched by a predetermined thickness. The etching should be performed in condition that the gate insulating layer 30 is not etched. It is preferable that the thickness of the second photoresist pattern 112 is so thick as to not expose the underlying data line assembly through the etching.

As a result, source electrodes 65 and the drain electrodes 66 are formed to separate from each other, and the data line assembly and the underlying ohmic contact patterns 55, 56, and 58 are completed.

Finally, the second photoresist pattern portion 112 remained at the data line assembly area A is removed. The removal of the second photoresist pattern portion 112 can be performed after the source/drain conductive pattern 67 at the channel area C is removed before the removal of the underlying doped amorphous silicon layer pattern 57.

Figure 18A:
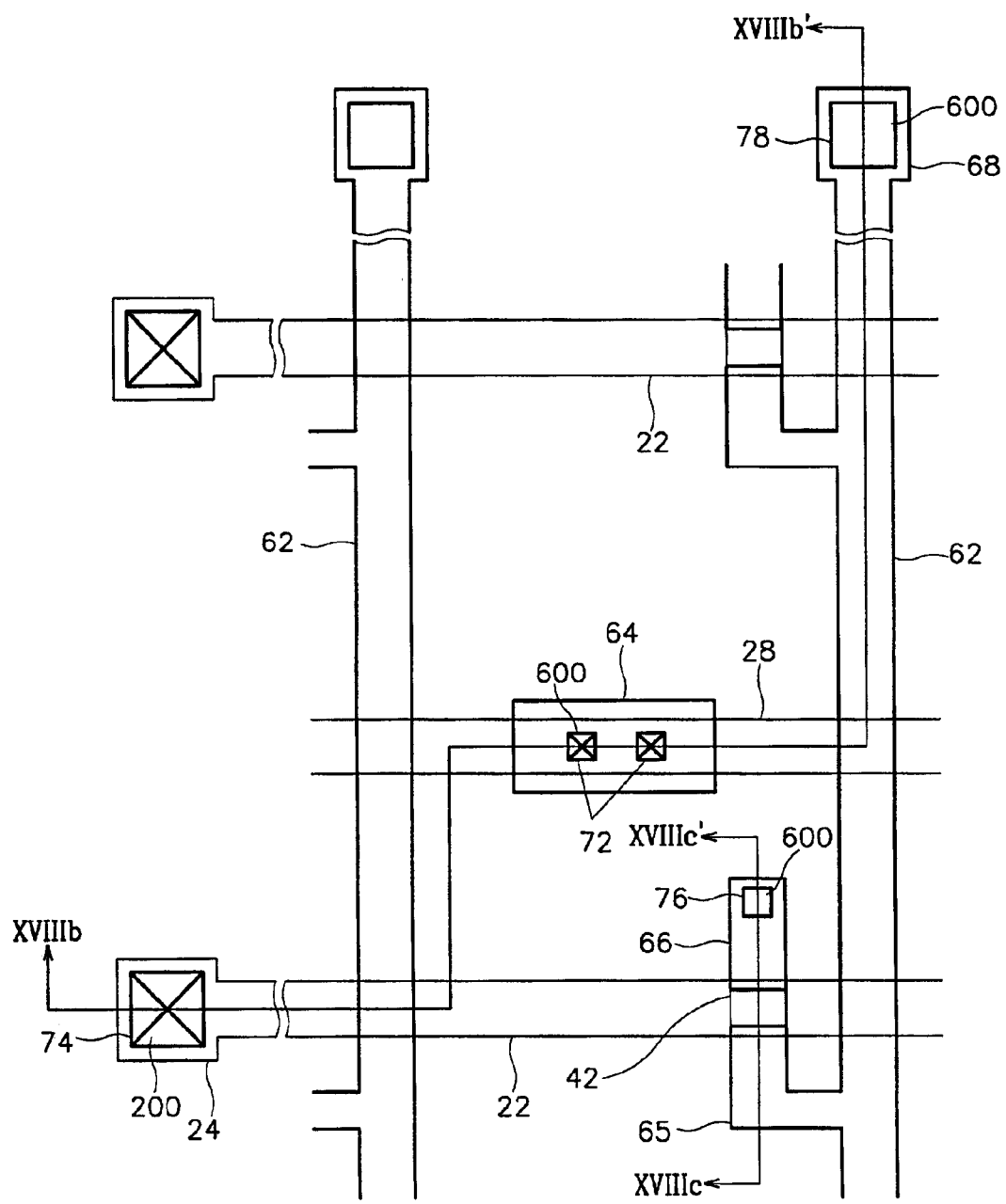
FIG. 18A illustrates the step of fabricating the thin film transistor array panel following the step illustrated in FIGS. 17A and 17B.
Figure 18B:
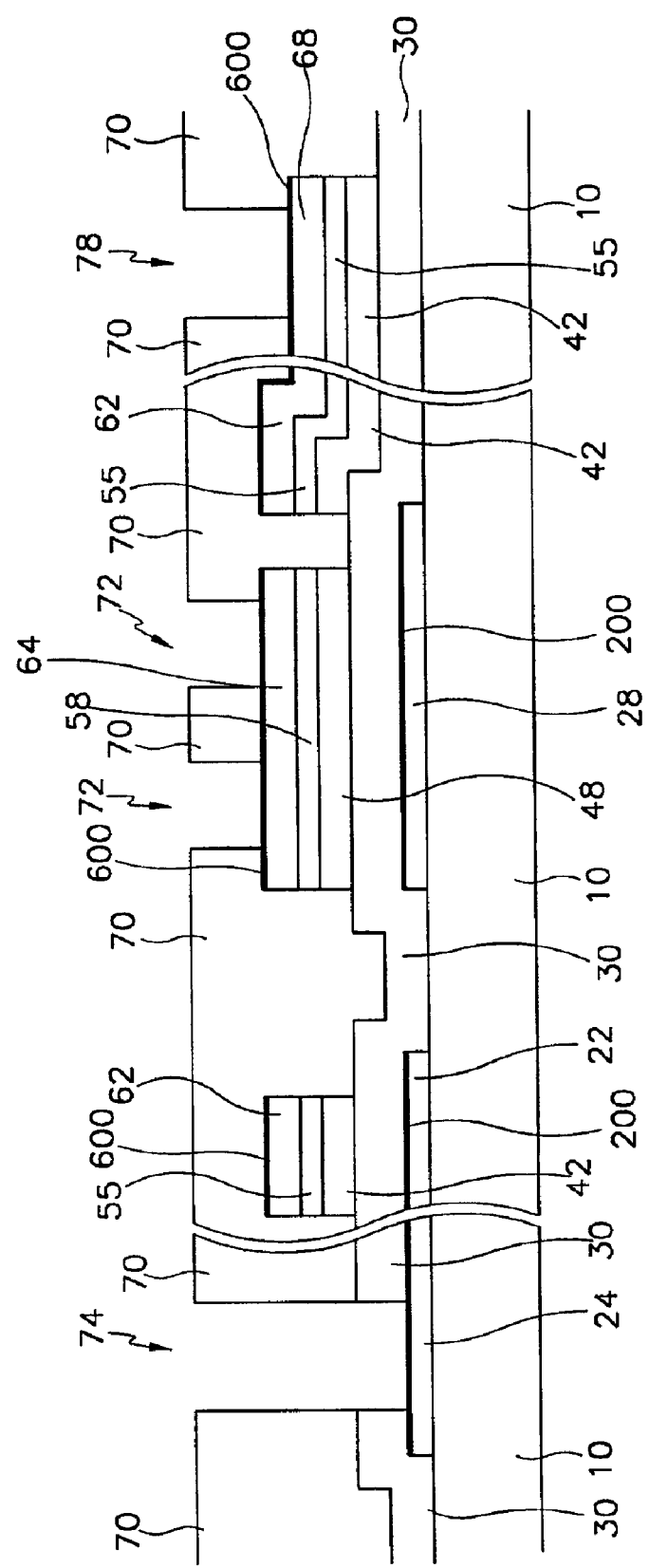
FIGS. 18B and 18C are cross sectional views of the thin film transistor array panel taken along the XVIIIb–XVIIIb' line and the XVIIIc–XVIIIc' line of FIG. 18A.
Figure 18C:
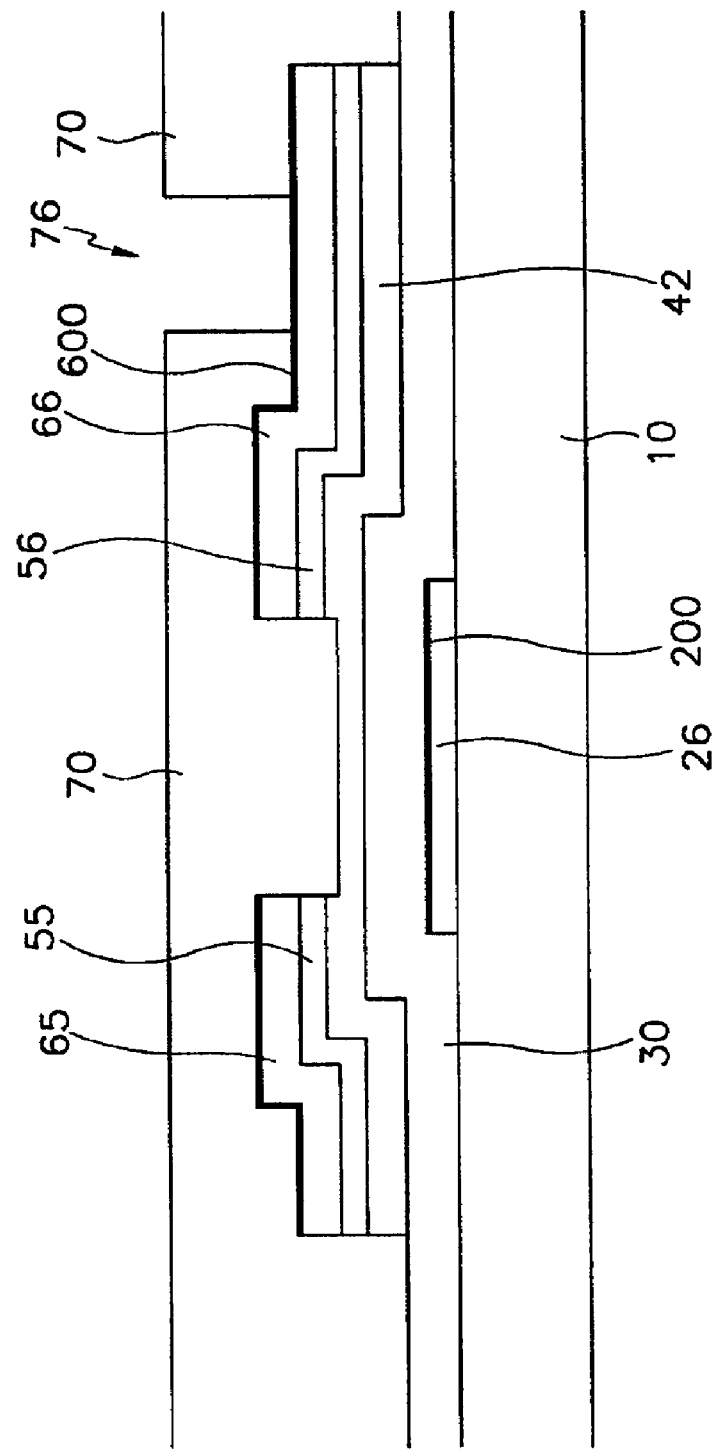

After the data line assembly is formed while being overlaid with the second low resistance conductive layer 600, as shown in FIGS. 18A to 18C, a protective layer 70 having a thickness of about 3000 Å or more is formed through depositing a silicon nitride layer by way of chemical vapor deposition (CVD) or spin-coating with an organic insulating film. The protective layer 70 is etched together with the gate insulating layer 30 using a third mask to thereby form contact holes 76, 74, 78, and 72 exposing the first and second low resistance conductive layers 200 and 600 over the drain electrodes 66, the gate pads 24, the data pads 68, and the storage capacitor conductive patterns 64, respectively.

Finally, referring back to FIGS. 9 to 11, an IZO-based layer having a thickness of about 400 Å to about 500 Å is deposited on the protective layer 70 having the contact holes 76, 74, 78, and 72, and etched using a fourth mask to thereby form pixel electrodes 82, and subsidiary gate and data pads 84 and 88. The pixel electrodes 82 are electrically connected to the drain electrodes 66 and the storage capacitor conductive patterns 64 through the contact holes 76 and 72, respectively, via the second low resistance conductive layer 600. The subsidiary gate and data pads 84 and 88 are connected to the gate and the data pads 24 and 68 through the contact holes 74 and 78 via the first and second low resistance conductive layers 200 and 600, respectively.

In this preferred embodiment, the data line assembly, and the underlying ohmic contact patterns 55, 56, and 58 and semiconductor patterns 42 and 48 are formed using one mask while separating the source and the drain electrodes 65 and 66 from each other, thereby simplifying the processing steps.

As described above, a low resistance conductive layer including nitrogen and aluminum is continuously deposited (without vacuum break) onto a wiring line assembly conductive layer including aluminum, thereby minimizing or avoiding the possibility of forming a high resistance oxide layer such as an aluminum oxide layer. In this way, the processing conditions can be uniformly designed while minimizing the contact resistance at a contact area, thereby ensuring reliability at the contact area. Furthermore, the wiring line assembly is formed with a low resistance material such as aluminum and aluminum alloy, thereby enhancing the performance characteristics of the wide-screened high definition display device.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A method of fabricating a thin film transistor array panel for a liquid crystal display, the method comprising the steps of:

forming a gate line assembly on an insulating substrate, the gate line assembly including gate lines and gate electrodes connected to the gate lines;

forming a gate insulating layer on the insulating substrate having the gate line assembly;

forming a semiconductor layer on the gate insulating layer;

forming a data line assembly, the data line assembly including data lines crossing over the gate lines, source electrodes connected to the data lines and placed adjacent to the gate electrodes, and drain electrodes placed opposite to the source electrodes with respect to the gate electrodes;

depositing a protective layer onto the insulating substrate having the data line assembly;

patterning the protective layer to form first contact holes exposing the drain electrodes; and forming pixel electrodes on the protective layer such that the pixel electrodes are electrically connected to the drain electrodes;

forming a low resistance conductive layer on the gate line assembly or the data line assembly.

2. The method of claim 1, wherein the low resistance conductive layer on the gate line assembly or the data line assembly is aluminum or an aluminum alloy.

3. The method of claim 2, wherein the low resistance conductive layer is continuously formed on the gate line assembly or the data line assembly, respectively, in a vacuum condition.

4. The method of claim 1, wherein the low resistance conductive layer is formed through reactive sputtering with addition of nitrogen gas.

5. The method of claim 1, wherein the low resistance conductive layer comprises a layer containing nitrogen.

6. The method of claim 5, wherein the nitrogen containing layer comprises one of an aluminum nitride layer, aluminum alloy nitride layer, and aluminum/neodymium alloy nitride layer.

7. The method of claim 1, where the gate line assembly or the data line assembly further comprise a second conductive layer having one of molybdenum, molybdenum alloy, chrome, and tantalum.

8. The method of claim 1, wherein the gate line assembly further comprises the gate pads for receiving scanning signals from the outside and transmitting the scanning signals to the gate lines, the data line assembly further comprises data pads for receiving image signals from the outside and transmitting the image signals to the data lines, and the protective layer further comprises second contact holes exposing the data pads and third contact holes exposing the gate pads together with the gate insulating layer, and the method further comprising the step of forming subsidiary gate pads and subsidiary data pads at the same level as the pixel electrodes such that the subsidiary gate pads and subsidiary data pads are electrically connected to the gate pads and the data pads through the second contact holes and the third contact holes, respectively.

9. The method of claim 1, wherein the pixel electrodes are formed with indium zinc oxide.

10. The method of claim 1, wherein the data line assembly and the semiconductor layer are formed through one photolithography process using a photoresist pattern differentiated in thickness.

11. The method of claim 10, wherein the data line assembly and the semiconductor layer are formed using one mask.

* * * * *